United States Patent
Elsherif

(10) Patent No.: US 9,872,306 B2
(45) Date of Patent: Jan. 16, 2018

(54) EFFICIENT OPTIMAL GROUP ID MANAGEMENT SCHEME FOR MU-MIMO SYSTEMS

(71) Applicant: QUALCOMM Incorporated, San Diego, CA (US)

(72) Inventor: Ahmed Ragab Elsherif, Santa Clara, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 63 days.

(21) Appl. No.: 14/729,037

(22) Filed: Jun. 2, 2015

(65) Prior Publication Data

US 2016/0360542 A1    Dec. 8, 2016

(51) Int. Cl.
*H04W 72/12* (2009.01)
*H04B 7/0452* (2017.01)
*H04W 8/18* (2009.01)

(52) U.S. Cl.
CPC ........ *H04W 72/121* (2013.01); *H04B 7/0452* (2013.01); *H04W 8/186* (2013.01); *H04W 72/1289* (2013.01)

(58) Field of Classification Search
None
See application file for complete search history.

(56) References Cited

U.S. PATENT DOCUMENTS

| 8,861,447 | B2 | 10/2014 | Kim et al. |
| 2012/0163483 | A1 | 6/2012 | Stacey et al. |
| 2013/0301551 | A1 | 11/2013 | Ghosh et al. |

FOREIGN PATENT DOCUMENTS

| EP | 2741431 A2 | 6/2014 | |
| WO | WO 2011146415 A1 * | 11/2011 | .......... H04W 72/121 |
| WO | WO-2011146415 A1 | 11/2011 | |
| WO | WO-2012087539 A1 | 6/2012 | |
| WO | WO-2012115432 A2 | 8/2012 | |
| WO | WO-2013024838 A1 | 2/2013 | |

OTHER PUBLICATIONS

International Search Report and Written Opinion—PCT/US2016/030645—ISA/EPO—dated Jul. 4, 2016.
Perahia E., et al., "Next Generation Wireless LANs", Chapter 14.4 Group ID, Apr. 30, 2013, pp. 435 and 436.

* cited by examiner

*Primary Examiner* — Kouroush Mohebbi
(74) *Attorney, Agent, or Firm* — Patterson & Sheridan, LLP

(57) ABSTRACT

Certain aspects of the present disclosure relate to efficient optimal group identification (GID) management for multiple user (MU) multiple-input multiple-output (MIMO) communications. Certain aspects of the present disclosure provide an apparatus for wireless communications. The apparatus generally includes a processing system configured to: for each GID of a plurality of GIDs, assign a plurality of devices to positions within one or more groups associated with that GID and generate GID management frames for transmission to active devices of the assigned plurality of devices indicating, for each of the active devices, a position of that active device within each of the plurality of GID; and an interface configured to output the GID management frames for transmission to the active devices.

24 Claims, 26 Drawing Sheets

700
| P₀ | P₁ | P₂ | P₃ |
|---|---|---|---|
| 0 | 1 | 2 | 3 |
| 4 | 5 | x | x |
FIG. 7
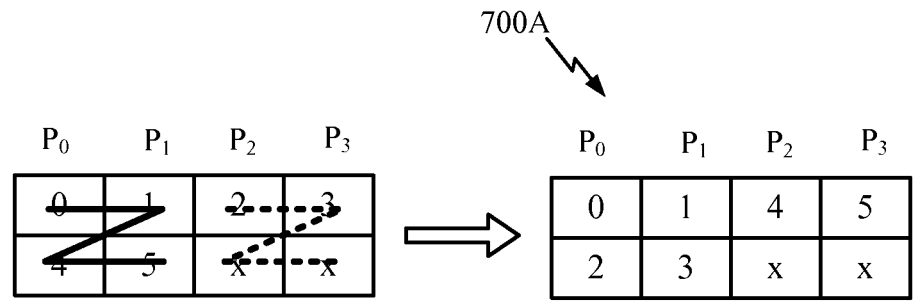
FIG. 7A
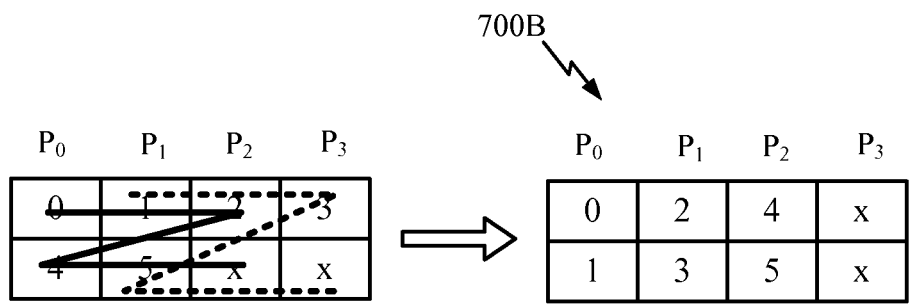
FIG. 7B

800

|  $P_0$ | $P_1$ | $P_2$ | $P_3$ |
|---|---|---|---|
| 0 | 1 | 2 | 3 |
| 4 | 5 | 6 | 7 |
| 8 | 9 | 10 | 11 |
| 12 | 13 | 14 | 15 |

| $P_0$ | $P_1$ | $P_2$ | $P_3$ |
|---|---|---|---|
| 0 | 1 | 4 | 5 |
| 2 | 3 | 6 | 7 |
| 8 | 9 | 12 | 13 |
| 10 | 11 | 14 | 15 |

| $P_0$ | $P_1$ | $P_2$ | $P_3$ |
|---|---|---|---|
| 0 | 1 | 8 | 9 |
| 2 | 3 | 10 | 11 |
| 4 | 5 | 12 | 13 |
| 6 | 7 | 14 | 15 |

FIG. 8B

| | $P_0$ | $P_1$ | $P_2$ | $P_3$ |
|---|---|---|---|---|
| | 0 | 1 | 2 | 3 |
| | 4 | 5 | 6 | 7 |
| | 8 | 9 | 10 | 11 |
| | 12 | 13 | 14 | 15 |
| | 16 | 17 | x | x |
FIG. 9
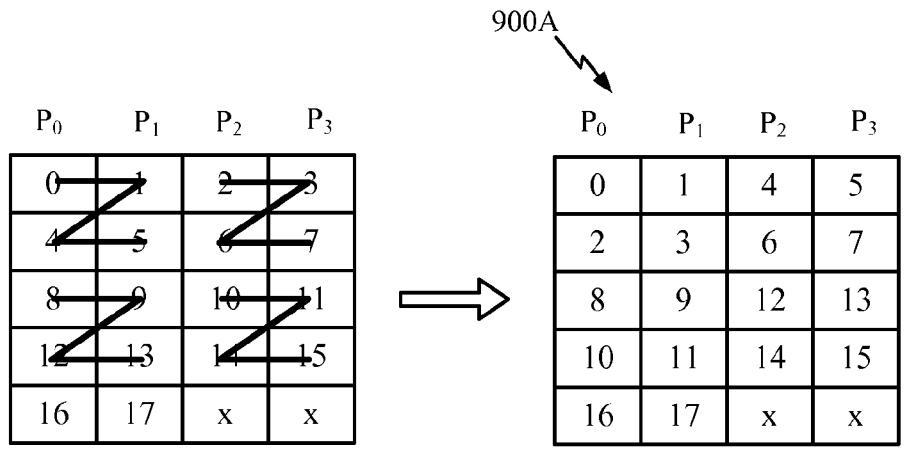
FIG. 9A
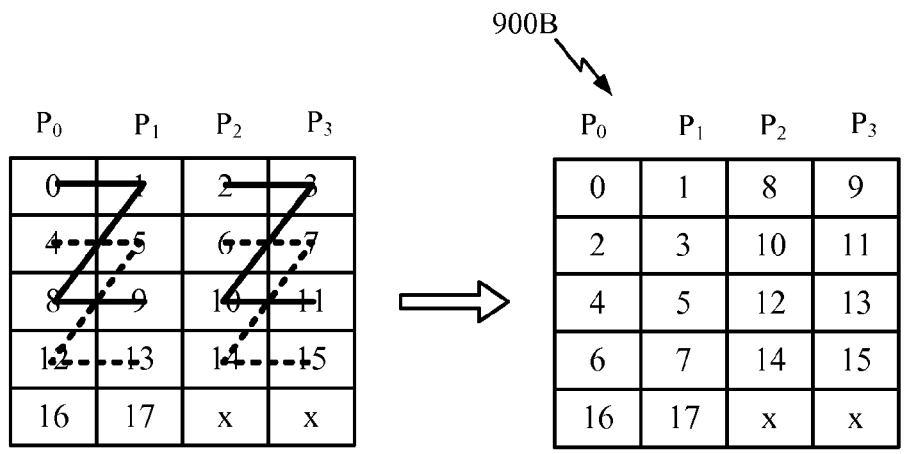
FIG. 9B

| P₀ | P₁ | P₂ | P₃ |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | x | x |
| x | x | x | x |
| x | x | x | x |
| x | x | x | x |

⟹

| P₀ | P₁ | P₂ | P₃ |
|---|---|---|---|
| 0 | 8 | 16 | x |
| 1 | 9 | 17 | x |
| 2 | 10 | x | x |
| 3 | 11 | x | x |
| 4 | 12 | x | x |
| 5 | 13 | x | x |
| 6 | 14 | x | x |
| 7 | 15 | x | x |

| P₀ | P₁ | P₂ | P₃ |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | x | x |
| x | x | x | x |
| x | x | x | x |
| x | x | x | x |

⟹

| P₀ | P₁ | P₂ | P₃ |
|---|---|---|---|
| 0 | 4 | 16 | x |
| 1 | 5 | 17 | x |
| 2 | 6 | x | x |
| 3 | 7 | x | x |
| 8 | 12 | x | x |
| 9 | 13 | x | x |
| 10 | 14 | x | x |
| 11 | 15 | x | x |

FIG. 9I

- Column and row indices → UID (c: column index, r: row index → UID: user index (all 0-based))
- Base matrix: $UID(c, r) = r * 4 + c$
- W1H1 Z matrix: $UID(c, r) = \lfloor \frac{r}{2} \rfloor * 8 + mod(r, 2) * 2 + \lfloor \frac{c}{2} \rfloor * 4 + mod(c, 2)$
- W2H1 Z matrix: $UID(c, r) = \lfloor \frac{r}{2} \rfloor * 8 + mod(r, 2) + c * 2$
- W1H2 Z matrix: $UID(c, r) = \lfloor \frac{r}{4} \rfloor * 8 + r * 2 + \lfloor \frac{c}{2} \rfloor * 8 + mod(c, 2)$
- W2H2 Z matrix: $UID(c, r) = \lfloor \frac{r}{4} \rfloor * 8 + \lfloor \frac{r}{2} \rfloor * 4 + mod(r, 2) + \lfloor \frac{c}{2} \rfloor * 8 + mod(c, 2) * 2$
- W1H4 Z matrix: $UID(c, r) = \lfloor \frac{r}{8} \rfloor * 16 + r * 2 + \lfloor \frac{c}{2} \rfloor * 16 + mod(c, 2)$
- W2H4 Z matrix: $UID(c, r) = \lfloor \frac{r}{8} \rfloor * 16 + \lfloor \frac{r}{2} \rfloor * 4 + mod(r, 2) + \lfloor \frac{c}{2} \rfloor * 16 + mod(c, 2) * 2$
- VR4H matrix: Derived from the base matrix by first appending x's up to a multiple of 4 rows, then vertically read elements from the base matrix and horizontally write them.
- Step 2 matrix: $UID(c,r) = \lfloor \frac{r}{8} \rfloor * 32 + mod(r, 8) + c * 8$
- Slit 2 matrix: $UID(c,r) = \lfloor \frac{r}{8} \rfloor * 16 + \lfloor \frac{r}{4} \rfloor * 8 + mod(r, 4) + \lfloor \frac{c}{2} \rfloor * 16 + mod(c, 2) * 4$
- W1H8 Z matrix: $UID(c,r) = \lfloor \frac{r}{16} \rfloor * 32 + r * 2 + \lfloor \frac{c}{2} \rfloor * 32 + mod(c, 2)$
- W2H8 Z matrix $UID(c,r) = \lfloor \frac{r}{16} \rfloor * 32 + \lfloor \frac{r}{2} \rfloor * 4 + mod(r, 2) + \lfloor \frac{c}{2} \rfloor * 32 + mod(c, 2) * 2$
- Step 4 matrix: $UID(c,r) = \lfloor \frac{r}{16} \rfloor * 64 + mod(r, 16) + c * 16$
- Slit 6 matrix: $UID(c,r) = \lfloor \frac{r}{16} \rfloor * 32 + \lfloor \frac{r}{4} \rfloor * 8 + mod(r, 4) + \lfloor \frac{c}{2} \rfloor * 32 + mod(c, 2) * 4$
- Step 2-6-2 matrix: $UID(c,r) = \lfloor \frac{r}{16} \rfloor * 32 + \lfloor \frac{r}{8} \rfloor * 16 + mod(r, 8) + \lfloor \frac{c}{2} \rfloor * 32 + mod(c, 2) * 8$
- Step_8_24_8 matrix: $UID(c,r) = \lfloor \frac{r}{64} \rfloor * 128 + \lfloor \frac{r}{32} \rfloor * 64 + mod(r, 32) + \lfloor \frac{c}{2} \rfloor * 128 + mod(c,2)*32$
- W1H64 matrix: $UID(c,r) = \lfloor \frac{r}{128} \rfloor * 256 + r*2 + \lfloor \frac{c}{2} \rfloor * 256 + mod(c,2)$
- W2H64 matrix: $UID(c,r) = \lfloor \frac{r}{128} \rfloor * 256 + \lfloor \frac{r}{2} \rfloor * 4 + mod(r,2) + \lfloor \frac{c}{2} \rfloor * 256 + mod(c,2)*2$
- Step_32 matrix: $UID(c,r) = \lfloor \frac{r}{128} \rfloor * 512 + mod(r,128) + c*128$
- Slit_62 matrix: $UID(c,r) = \lfloor \frac{r}{128} \rfloor * 256 + \lfloor \frac{r}{4} \rfloor * 4 + r + \lfloor \frac{c}{2} \rfloor * 256 + mod(c,2)*4$
- Step_2_62_2 matrix: $UID(c,r) = \lfloor \frac{r}{128} \rfloor * 256 + \lfloor \frac{r}{8} \rfloor * 16 + mod(r,8) + \lfloor \frac{c}{2} \rfloor * 256 + mod(c,2)*8$
- Step_4_60_4 matrix: $UID(c,r) = \lfloor \frac{r}{128} \rfloor * 256 + \lfloor \frac{r}{16} \rfloor * 32 + mod(r,16) + \lfloor \frac{c}{2} \rfloor * 256 + mod(c,2)*16$
- Step_8_56_8 matrix: $UID(c,r) = \lfloor \frac{r}{128} \rfloor * 256 + \lfloor \frac{r}{32} \rfloor * 64 + mod(r,32) + \lfloor \frac{c}{2} \rfloor * 256 + mod(c,2)*32$
- Step_16_48_16 matrix: $UID(c,r) = \lfloor \frac{r}{128} \rfloor * 256 + \lfloor \frac{r}{64} \rfloor * 128 + mod(r,64) + \lfloor \frac{c}{2} \rfloor * 256 + mod(c,2)*64$

FIG. 11

- W1H128 matrix: $UID(c,r) = \lfloor\frac{r}{256}\rfloor*512 + r*2 + \lfloor\frac{c}{2}\rfloor*512 + mod(c,2)$

- W2H128 matrix: $UID(c,r) = \lfloor\frac{r}{256}\rfloor*512 + \lfloor\frac{r}{2}\rfloor*4 + mod(r,2) + \lfloor\frac{c}{2}\rfloor*512 + mod(c,2)*2$

- Step_64 matrix: $UID(c,r) = \lfloor\frac{r}{256}\rfloor*1024 + mod(r,128) + c*256$

- Slit_126 matrix: $UID(c,r) = \lfloor\frac{r}{256}\rfloor*512 + \lfloor\frac{r}{4}\rfloor*4 + r + \lfloor\frac{c}{2}\rfloor*512 + mod(c,2)*4$

- Step_2_126_2 matrix: $UID(c,r) = \lfloor\frac{r}{256}\rfloor*512 + \lfloor\frac{r}{8}\rfloor*16 + mod(r,8) + \lfloor\frac{c}{2}\rfloor*512 + mod(c,2)*8$

- Step_4_124_4 matrix: $UID(c,r) = \lfloor\frac{r}{256}\rfloor*512 + \lfloor\frac{r}{16}\rfloor*32 + mod(r,16) + \lfloor\frac{c}{2}\rfloor*512 + mod(c,2)*16$

- Step_8_120_8 matrix: $UID(c,r) = \lfloor\frac{r}{256}\rfloor*512 + \lfloor\frac{r}{32}\rfloor*64 + mod(r,32) + \lfloor\frac{c}{2}\rfloor*512 + mod(c,2)*32$

- Step_16_112_16 matrix: $UID(c,r) = \lfloor\frac{r}{256}\rfloor*512 + \lfloor\frac{r}{64}\rfloor*128 + mod(r,64) + \lfloor\frac{c}{2}\rfloor*512 + mod(c,2)*64$

- Step_32_96_32 matrix: $UID(c,r) = \lfloor\frac{r}{256}\rfloor*512 + \lfloor\frac{r}{128}\rfloor*256 + mod(r,128) + \lfloor\frac{c}{2}\rfloor*512 + mod(c,2)*128$

FIG. 11A

Base matrix $$r = \left\lfloor \frac{UID}{4} \right\rfloor$$

$$c = mod(UID, 4)$$

FIG. 12

W1H1 Z matrix $$r_2 = \left\lfloor \frac{UID}{8} \right\rfloor$$
$$\widehat{UID} = UID - r_2 * 8$$
$$I_{gte_4} = \left\lfloor \frac{\widehat{UID}}{4} \right\rfloor$$
$$I_o = mod(\widehat{UID}, 2)$$

$$r = r_2 * 2 + \left\lfloor \frac{\widehat{UID} - I_{gte_4} * 4}{2} \right\rfloor$$

$$c = I_{gte_4} * 2 + I_o$$

FIG. 12A

W2H1 Z matrix $$r_2 = \left\lfloor \frac{UID}{8} \right\rfloor$$
$$\widehat{UID} = UID - r_2 * 8$$
$$I_o = mod(\widehat{UID}, 2)$$

$$r = r_2 * 2 + I_o$$

$$c = \frac{\widehat{UID} - I_o}{2}$$

FIG. 12B

W1H2 Z matrix $$r_4 = \left\lfloor \frac{UID}{16} \right\rfloor$$

$$\widehat{UID} = UID - r_4 * 16$$

$$I_{gte_8} = \left\lfloor \frac{\widehat{UID}}{8} \right\rfloor$$

$$I_o = mod(\widehat{UID}, 2)$$

$$r = r_4 * 4 + \left\lfloor \frac{\widehat{UID} - I_{gte_8} * 8}{2} \right\rfloor$$

$$c = I_{gte_8} * 2 + I_o$$

FIG. 12C

W2H2 Z matrix $$r_4 = \left\lfloor \frac{UID}{16} \right\rfloor$$

$$\widehat{UID} = UID - r_4 * 16$$

$$I_{gte_8} = \left\lfloor \frac{\widehat{UID}}{8} \right\rfloor$$

$$I_o = mod(\widehat{UID}, 2)$$

$$r = r_4 * 4 + \left\lfloor \frac{\widehat{UID} - I_{gte_8} * 8}{4} \right\rfloor * 2 + I_o$$

$$c = I_{gte_8} * 2 + mod(\frac{\widehat{UID} - I_o}{2}, 2)$$

FIG. 12D

VR4HW4 matrix $$r = f(M)$$

$$c = mod(\left\lfloor \frac{UID}{4} \right\rfloor, 4)$$

FIG. 12E

W1H4 Z matrix $$r_8 = \left\lfloor \frac{UID}{32} \right\rfloor$$

$$\widehat{UID} = UID - r_8 * 32$$

$$I_{gte_{16}} = \left\lfloor \frac{\widehat{UID}}{16} \right\rfloor$$

$$I_o = mod(\widehat{UID}, 2)$$

$$r = r_8 * 8 + \left\lfloor \frac{\widehat{UID} - I_{gte_8} * 16}{2} \right\rfloor$$

$$c = I_{gte_{16}} * 2 + I_o$$

FIG. 12F

W2H4 Z matrix $$r_8 = \left\lfloor \frac{UID}{32} \right\rfloor$$

$$\widehat{UID} = UID - r_8 * 32$$

$$I_{gte_{16}} = \left\lfloor \frac{\widehat{UID}}{16} \right\rfloor$$

$$I_o = mod(\widehat{UID}, 2)$$

$$r = r_8 * 8 + \left\lfloor \frac{\widehat{UID} - I_{gte_{16}} * 16}{4} \right\rfloor * 2 + I_o$$

$$c = I_{gte_{16}} * 2 + mod(\frac{\widehat{UID} - I_o}{2}), 2$$

FIG. 12G

Step 2 matrix $$r_8 = \left\lfloor \frac{UID}{32} \right\rfloor$$

$$\widehat{UID} = UID - r_8 * 32$$

$$I_{gte_{16}} = \left\lfloor \frac{\widehat{UID}}{16} \right\rfloor$$

$$r = r_8 * 8 + mod(\widehat{UID}, 8)$$

$$c = I_{gte_{16}} * 2 + \left\lfloor \frac{\widehat{UID} - I_{gte_{16}} * 16}{8} \right\rfloor$$

FIG. 12H

Slit 2 matrix $$r_8 = \left\lfloor \frac{UID}{32} \right\rfloor$$

$$\widehat{UID} = UID - r_8 * 32$$

$$I_{gte_{16}} = \left\lfloor \frac{\widehat{UID}}{16} \right\rfloor$$

$$r = r_8 * 8 + \left\lfloor \frac{\widehat{UID} - I_{gte_{16}} * 16}{8} \right\rfloor * 4 + mod(\widehat{UID}, 4)$$

$$c = I_{gte_{16}} * 2 + \left\lfloor \frac{mod(\widehat{UID} - I_{gte_{16}} * 16, 8)}{4} \right\rfloor$$

FIG. 12I

W1H8 Z matrix $$r_{16} = \left\lfloor \frac{UID}{64} \right\rfloor$$

$$\widehat{UID} = UID - r_{16} * 64$$

$$I_{gte_{32}} = \left\lfloor \frac{\widehat{UID}}{32} \right\rfloor$$

$$I_o = mod(\widehat{UID}, 2)$$

$$r = r_{16} * 16 + \left\lfloor \frac{\widehat{UID} - I_{gte_{32}} * 32}{2} \right\rfloor$$

$$c = I_{gte_{32}} * 2 + I_o$$

FIG. 12J

W2H8 Z matrix $$r_{16} = \left\lfloor \frac{UID}{64} \right\rfloor$$

$$\widehat{UID} = UID - r_{16} * 64$$

$$I_{gte_{32}} = \left\lfloor \frac{\widehat{UID}}{32} \right\rfloor$$

$$I_o = mod(\widehat{UID}, 2)$$

$$r = r_{16} * 16 + \left\lfloor \frac{\widehat{UID} - I_{gte_{32}} * 32}{4} \right\rfloor * 2 + I_o$$

$$c = I_{gte_{32}} * 2 + mod(\frac{\widehat{UID} - I_o}{2}, 2)$$

FIG. 12K

Step 4 matrix $$r_{16} = \left\lfloor \frac{UID}{64} \right\rfloor$$
$$\widehat{UID} = UID - r_{16} * 64$$
$$I_{gte_{32}} = \left\lfloor \frac{\widehat{UID}}{32} \right\rfloor$$

$$r = r_{16} * 16 + mod(\widehat{UID}, 16)$$

$$c = I_{gte_{32}} * 2 + \left\lfloor \frac{\widehat{UID} - I_{gte_{32}} * 32}{16} \right\rfloor$$

FIG. 12L

Slit 6 matrix $$r_{16} = \left\lfloor \frac{UID}{64} \right\rfloor$$
$$\widehat{UID} = UID - r_{16} * 64$$
$$I_{gte_{32}} = \left\lfloor \frac{\widehat{UID}}{32} \right\rfloor$$

$$r = r_{16} * 16 + \left\lfloor \frac{\widehat{UID} - I_{gte_{32}} * 32}{8} \right\rfloor * 4 + mod(\widehat{UID}, 4)$$

$$c = I_{gte_{32}} * 2 + \left\lfloor \frac{mod(\widehat{UID} - I_{gte_{32}} * 32, 8)}{4} \right\rfloor$$

FIG. 12M

Step 2-6-2 matrix $$r_{16} = \left\lfloor \frac{UID}{64} \right\rfloor$$
$$\widehat{UID} = UID - r_{16} * 64$$
$$I_{gte_{32}} = \left\lfloor \frac{\widehat{UID}}{32} \right\rfloor$$

$$r = r_{16} * 16 + \left\lfloor \frac{\widehat{UID} - I_{gte_{32}} * 32}{16} \right\rfloor * 8 + mod(\widehat{UID}, 8)$$

$$c = I_{gte_{32}} * 2 + \left\lfloor \frac{mod(\widehat{UID} - I_{gte_{32}} * 32, 16)}{8} \right\rfloor$$

FIG. 12N

EFFICIENT OPTIMAL GROUP ID MANAGEMENT SCHEME FOR MU-MIMO SYSTEMS

BACKGROUND

Field of the Disclosure

Certain aspects of the present disclosure generally relate to wireless communications and, more particularly, to efficient optimal group identification (GID) management for multiple user (MU) multiple-input multiple-output (MIMO) systems.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to efficient optimal group identification (GID) management for multiple user (MU) multiple-input multiple-output (MIMO) systems.

Certain aspects of the present disclosure provide an apparatus for wireless communications. The apparatus generally includes a processing system configured to a processing system configured to: for each GID of a plurality of GIDs, assign a plurality of devices to positions within one or more groups associated with that GID, and generate GID management frames for transmission to active devices of the assigned plurality of devices indicating, for each of the active devices, a position of that active device within each of the plurality of GIDs; and an interface configured to output the GID management frames for transmission to the active devices.

Certain aspects of the present disclosure provide a method for wireless communications. The method generally includes assigning, for each GID of a plurality of GIDs, a plurality of devices to positions within one or more groups associated with that GID, generating GID management frames for transmission to active devices of the assigned plurality of devices indicating, for each of the active devices, a position of that active device within each of the plurality of GIDs, and outputting the GID management frames for transmission to the active devices.

Certain aspects of the present disclosure provide an apparatus for wireless communications. The apparatus generally includes means for assigning, for each GID of a plurality of GIDs, a plurality of devices to positions within one or more groups associated with that GID, means for generating GID management frames for transmission to active devices of the assigned plurality of devices indicating, for each of the active devices, a position of that active device within each of the plurality of GIDs, and means for outputting the GID management frames for transmission to the active devices.

Certain aspects of the present disclosure provide a computer program product for wireless communications. The computer program product generally includes a computer readable medium having instructions stored thereon for: assigning, for each GID of a plurality of GIDs, a plurality of devices to positions within one or more groups associated with that GID, generating GID management frames for transmission to active devices of the assigned plurality of devices indicating, for each of the active devices, a position of that active device within each of the plurality of GIDs, and outputting the GID management frames for transmission to the active devices.

Certain aspects of the present disclosure provide an access point (AP) for wireless communications. The AP generally includes at least one antenna; a processing system configured to: for each GID of a plurality of GIDs, assign a plurality of devices to positions within one or more groups associated with that GID, and generate GID management frames for transmission to active devices of the assigned plurality of devices indicating, for each of the active devices, a position of that active device within each of the plurality of GIDs; and a transmitter configured to transmit the GID management frames, via the at least one antenna, to the active devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7-7B are example diagrams illustrate three possible GID matrices with overloading for grouping 5-8 stations, in accordance with certain aspects of the present disclosure.

FIGS. 11-11A show the equations, corresponding to different GID matrices, for determining a user index (UID) to enter into a user position in a GID matrix, in accordance with certain aspects of the present disclosure.

FIG. 12-12N show the equations, corresponding to different GID matrices, for determining a station's user position in the GID matrices based on the station's UID, in accordance with certain aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
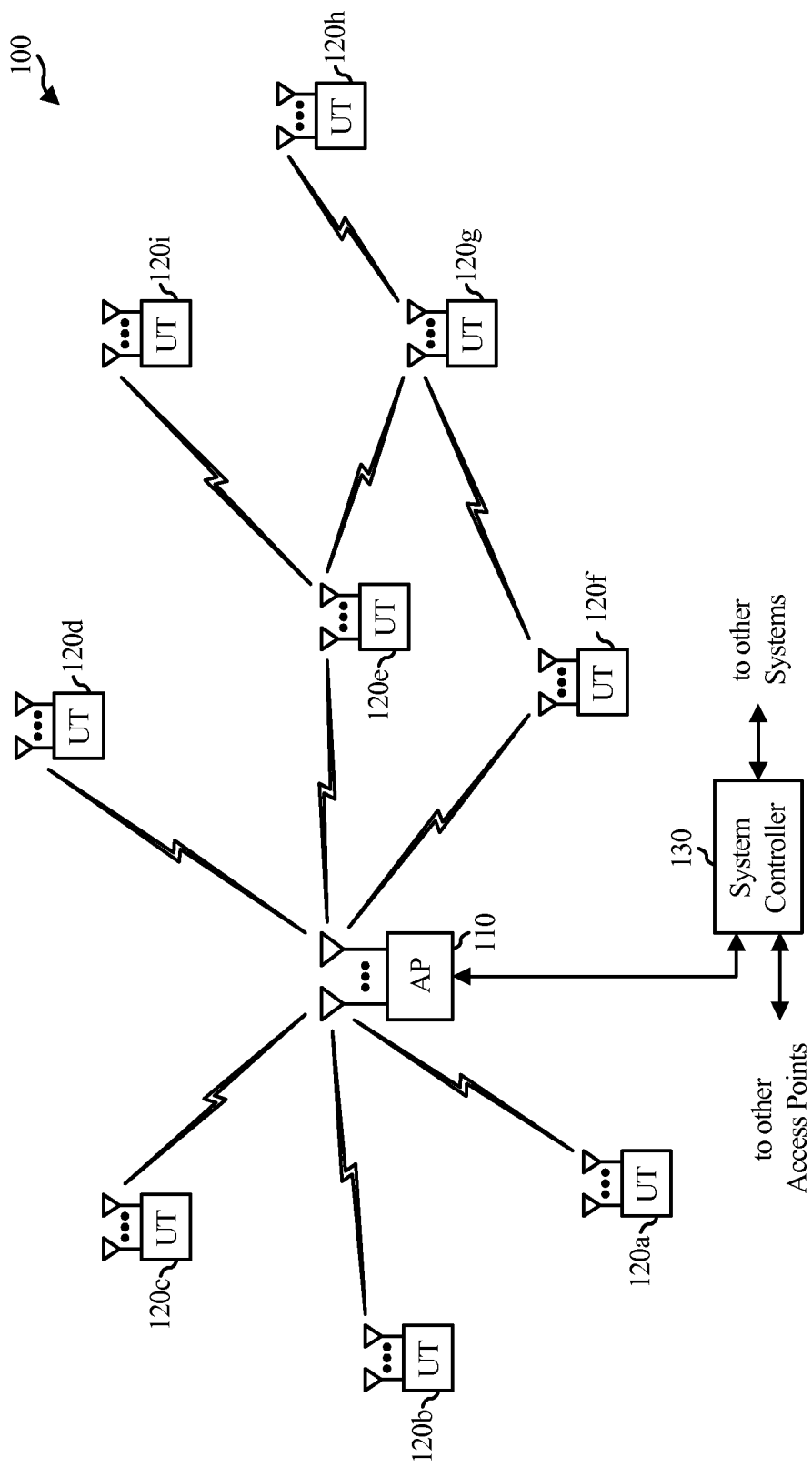
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to wireless communications and, more particularly, to efficient optimal group identification (GID) management for multiple user (MU) multiple-input multiple-output (MIMO) systems. As will be described in more detail herein, GIDs may be formed by assigning devices (e.g., stations) to positions within each group, for example, according to an algorithm or equation for forming groups. GID management frames may be generated and sent to active (e.g., associated) devices, each GID management frame indicating that device's position within each of the formed GIDs. Thus, when scheduling active devices for MU MIMO transmissions, a GID may be selected that is valid for the stations to be scheduled.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, user terminals 120 may be configured to communicate with the access point 110 via multi-user (MU) multiple-input multiple-output (MIMO) transmissions. The access point 110 may assign any number of user terminals (e.g., up to 2048) to positions within group identifications (GIDs) which may include user terminals 120. The access point 110 may generate and transmit GID management frames to active user terminals 120, each GID management frame indicating, for each user terminal 120, a position of that user terminal 120 within each of the GIDs.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
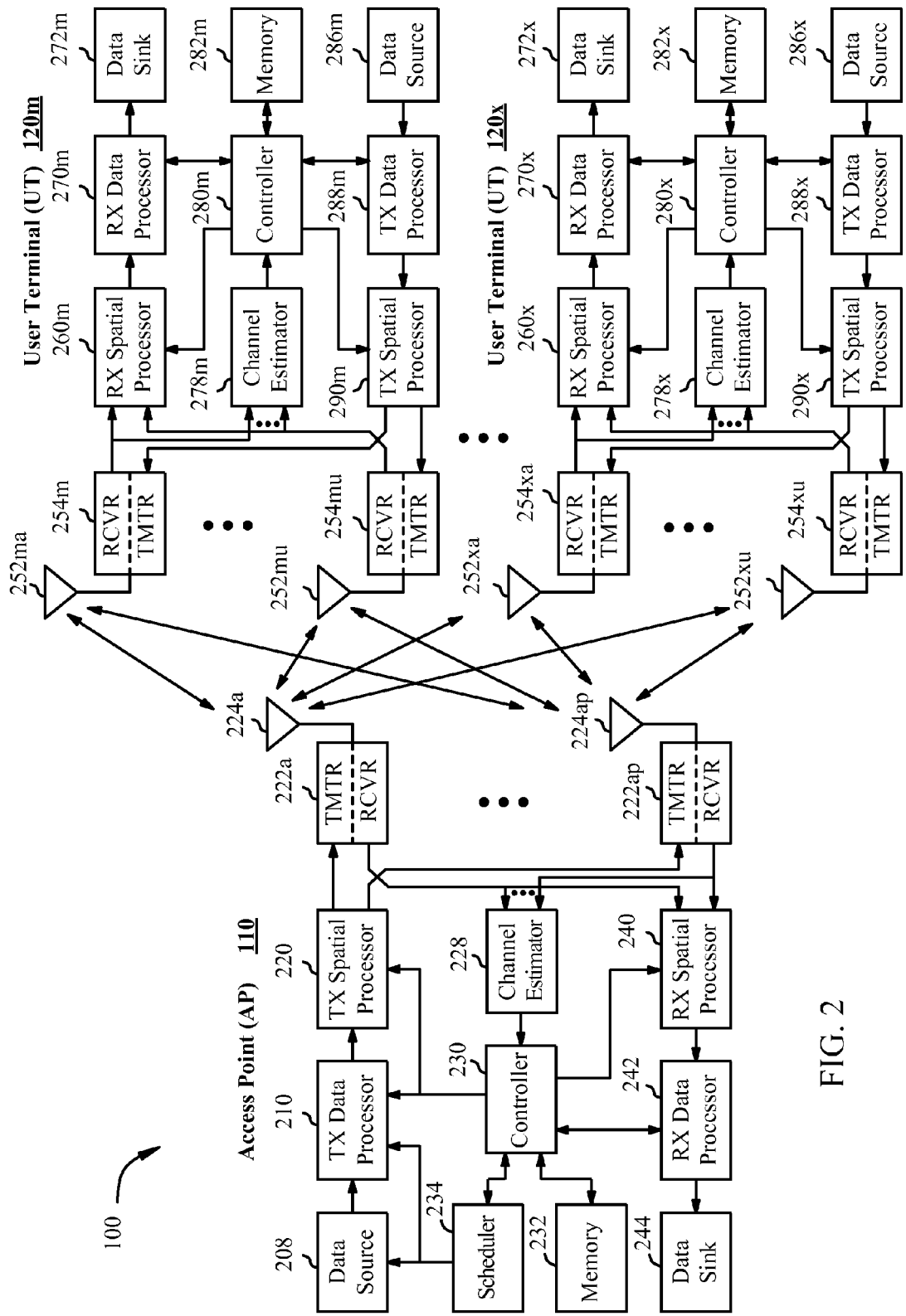
FIG. 2 is a block diagram of an example access point (AP) and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 of access point 110 may be used to perform the operations 600 described herein and illustrated with reference to FIGS. 6 and 6A.

FIG. 2 illustrates a block diagram of access point 110 two user terminals 120m and 120x in a MIMO system 100. The access point 110 is equipped with $N_t$ antennas 224a through

224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
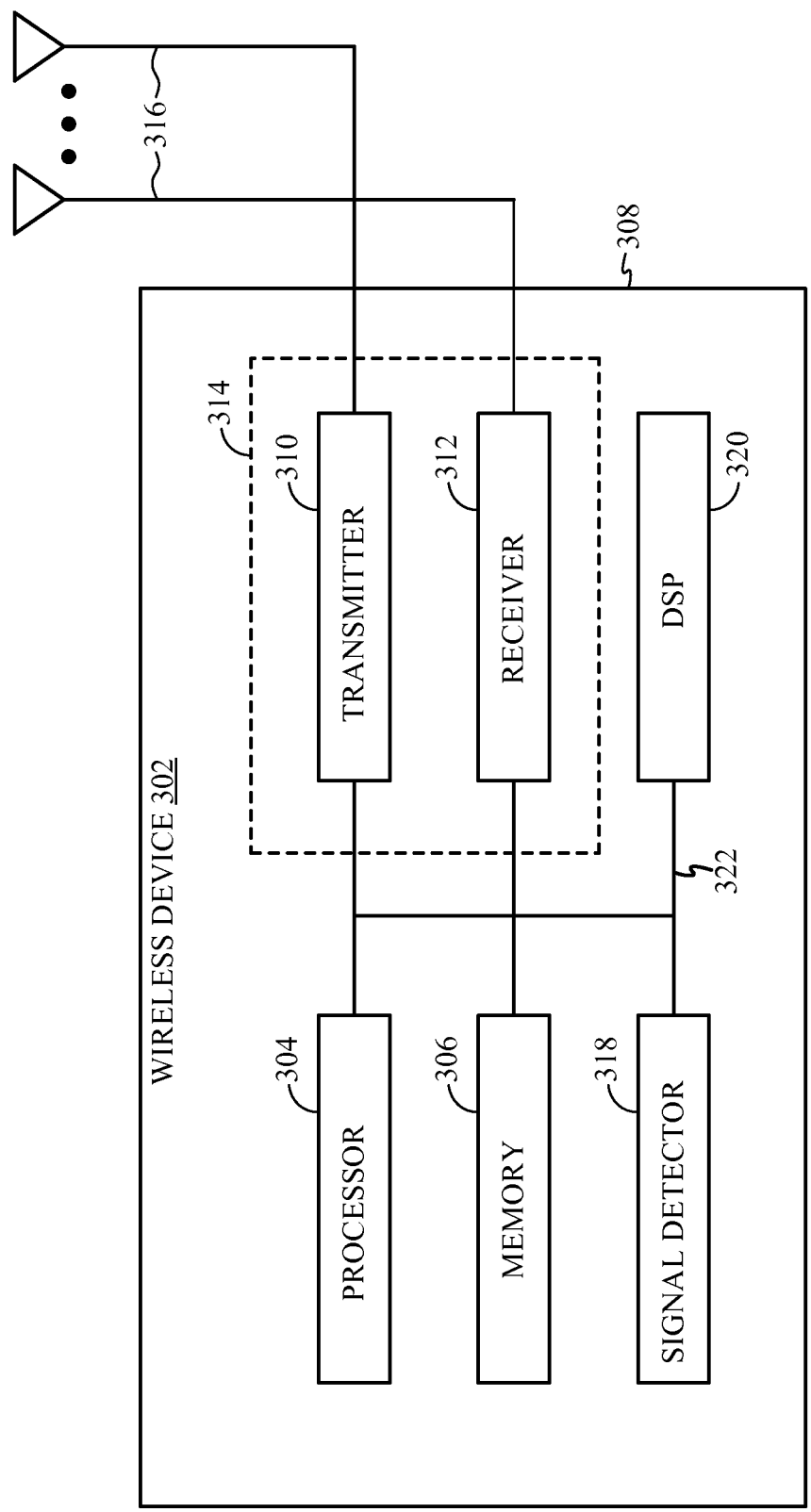
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 1000 and 1100 illustrated in FIGS. 10 and 11, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term multiple user (MU) transmission generally refers to a transmission from an access point to multiple users (whether sent as simultaneous or sequential packets within a transmit opportunity) or to a transmission to an access point from multiple users (whether sent as simultaneous or sequential packets within a transmit opportunity), while the term single user (SU) transmission generally refers to a transmission from an access point to a single user or to a transmission to an access point from a single user.

Example Efficient Optimal Group Id Management Scheme for MU-MIMO Systems

Figure 4:
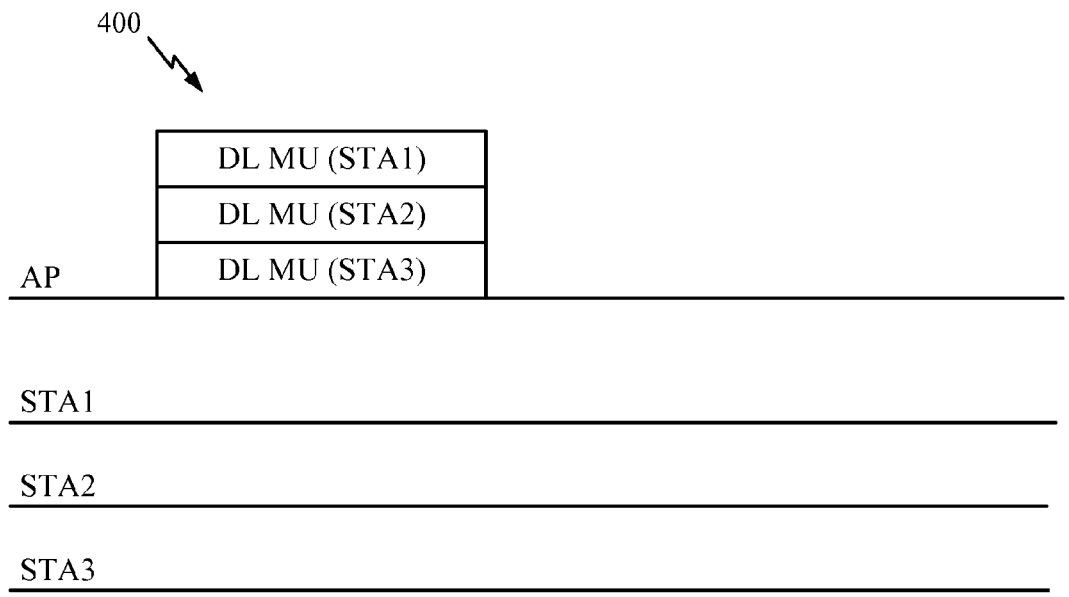
FIG. 4 is a time sequence diagram illustrating an example multi-user (MU) transmission, in accordance with certain aspects of the present disclosure.

According to certain aspects of the present disclosure, in multiple user (MU) communications, an uplink (UL) signal may be transmitted simultaneously from multiple user terminals (UTs) to an access point (AP), or alternatively, a downlink (DL) signal may be transmitted from an AP to multiple UTs simultaneously. FIG. 4 is a time sequence diagram illustrating an example MU transmission from an AP to multiple stations (e.g., STA1, STA2, and STA3 illustrated in FIG. 4), in accordance with certain aspects of the present disclosure.

For certain systems (e.g., IEEE 802.11ac or 802.11n systems) a group identification (GID) may be defined, for example, at the physical (PHY) layer. A group of stations may be assigned to the same GID, which indicates that data transmitted in the packet are sent to stations in this group. Stations in a group may be co-scheduled for MU multiple-input multiple-output (MU-MIMO) transmissions. The GID enable the receiver of a MU transmission to determine if the payload (e.g., in a PHY layer convergent protocol (PLCP) packet) includes a frame intended for that receiver. In one example, if the receiver determines that it is not intended to receive any payload, the receiver may enter a power save mode for the remainder of the transmission opportunity (TXOP). The GID may be included in a preamble of the packet. Each stations position within the group conveys the station's spatial stream position (i.e., which spatial stream in the MU-MIMO transmission is intended for that co-scheduled STA).

Figure 5:
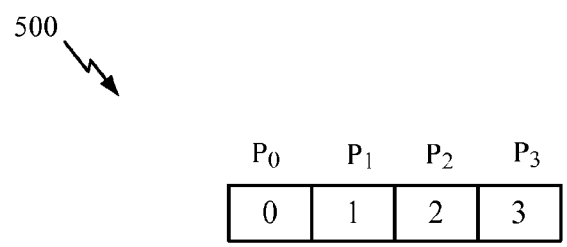
FIG. 5 is an example diagram illustrating a group identification (GID) matrix with no-overloading, in accordance with certain aspects of the present disclosure.

In fixed (i.e., static) grouping, each MU-capable station belongs to only one MU group with a fixed set of partner stations. For example, each group may contain up to four stations and 62 different GIDs may be used for MU-MIMO transmission. Thus, 248 stations may be grouped. However, for large numbers of stations, for example, greater than 248 stations (i.e., 62×4), 62 GIDs are not sufficient to cover all stations. Furthermore, if each station appears in only one group with 3 partner stations, forming MU packets may be limited if some or all of the partner stations do not have enough traffic. In this case, rather forming MU3 PPDUs, MU2 or SU transmissions, which have lower MU gain. FIG. 5 is an example diagram illustrating a GID matrix 500 with no GID overloading, in accordance with certain aspects of the present disclosure. As shown in FIG. 5, the example GID matrix 500 contains one group with up to four stations (0, 1, 2, 3), each of the four stations in a different user position ($P_0$, $P_1$, $P_2$, $P_3$). In the example illustrated in FIG. 5, station 0 may be the primary station and station 2 and station 3 may not have enough packets for MU transmission. In this case, an MU2 transmission to station 0 and station 1 would be sent.

With GID overloading, multiple groups (combinations) of stations may be mapped to one GID, where each MU user position can be assigned to multiple STAs using the same GID, thus allowing greater flexibility in the number of stations that can be scheduled together. According to certain aspects, a per-position overloading factor p may be defined. As p increases, the probability of forming PPDUs with larger number of MU STAs (e.g., MU3) also increases and less GIDs are needed for a given number of stations.

Techniques are provided herein for GID overloading management scheme without fixed grouping that increases grouping diversity (i.e., potential partner station groupings) and grouping coverage (i.e., number of covered groups out of all possible grouping combinations). The proposed GID overloading management scheme is scalable with the number of stations, systematic, and simple to implement (e.g., using equations with only binary divisions and multiplications), thus requiring minimal processing overhead. The proposed GID overloading management scheme may allow for opportunistic scheduling such that for a primary user in an MU group, partner stations may be selected from all available station combinations based on criteria (e.g., deepest queues) to form MU3 transmissions (e.g., PLCP protocol data units (PPDUs)). Increased grouping diversity may increase the probability of finding a GID for stations with enough packets and, thereby, increase the probability of forming PPDUs with larger numbers of MU stations.

Figure 6:
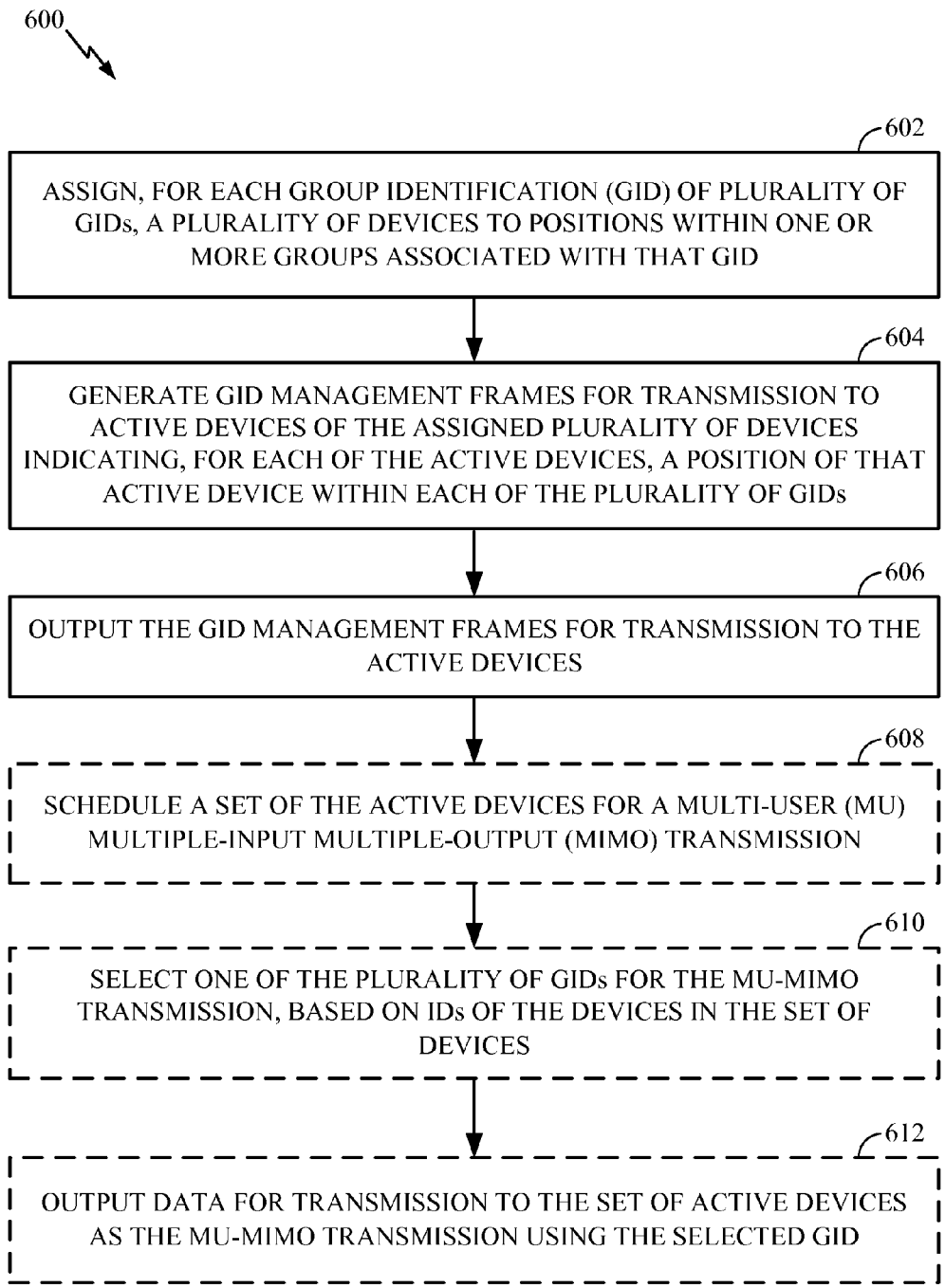
FIG. 6 is a flow diagram of example operations for wireless communications, in accordance with certain aspects of the present disclosure.
Figure 6A:
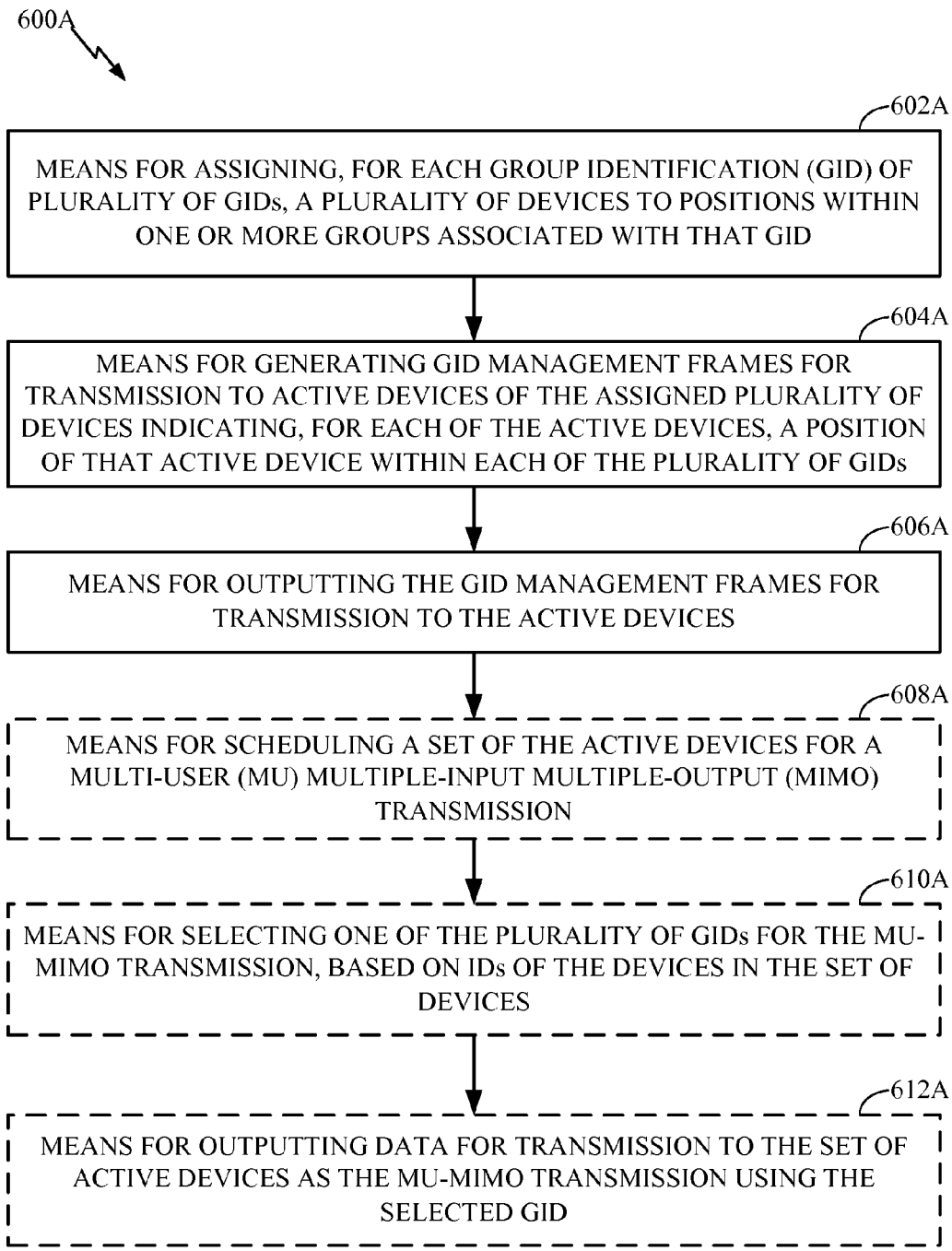
FIG. 6A illustrates example means capable of performing the operations shown in FIG. 6.

FIG. 6 is a flow diagram of example operations 600 for wireless communications, in accordance with certain aspects of the present disclosure. Operations 600 may be performed, for example, by an access point (AP) (e.g., such as AP 110). Operations 600 may begin, at 602, by assigning, for each GID of a plurality of GIDs, a plurality of devices (e.g., MU capable stations) to positions within one or more groups associated with that GID. For example, the AP may use GID overloading to assign multiple devices to the same position in different groups associated with the same GID, but avoid assigning a same device to different positions within different groups associated with the same GID. According to certain aspects, the formed GIDs may be stored for later use when a new device associates or, alternatively, the GIDs may be calculated on the fly, utilizing an equation associated with each of the GIDs (e.g., based on row and column index values for that GID), each time a new device associates.

At 604, the AP may generate (GID) management frames for transmission to active devices of the assigned plurality of devices indicating, for each of the active devices, a position of that active device within each of the plurality of GIDs.

At 606, the AP may output the GID management frames for transmission to the active devices.

At 608, the AP may schedule a set of the active devices for a MU MIMO transmission. The AP may select the devices to be scheduled based on Modulation and Coding Scheme (MCS), channel correlation, channel variation, Doppler profile, fairness, or traffic availability, for example, At 610, the AP may select one of the plurality of GIDs for the MU-MIMO transmission, based on IDs of the devices in the set of active devices. For example, the AP may determine a position of each active device with each of the plurality of GIDs based on an identification value associated with that active device and select a GID.

At 612, the AP may output data for transmission to the set of active devices as the MU-MIMO transmission using the selected GID. According to certain aspects, the AP may later associate with another device of the plurality of devices. In this case, the AP may generate an additional GID management frame for transmission to the other device indicating a position of the other device within each of the plurality of GIDs. The GID management frame may be transmitted only to the newly associated device; since the groups do not change, additional GID management frames may not be sent to currently associated devices.

Example GID Formations and Station Assignments

Each matrix may represent one GID with overloading. Each column of a matrix may represent an MU user position. And each entry under the columns may represent a station ID that can be assigned to that user position. Thus, each row in the matrix represents a possible combination of stations that may be co-scheduled for MU-MIMO transmission using the GID. In the description herein, M may be used to refer to the number of MU-capable stations to be grouped for potential MU-MIMO scheduling. Further, in the examples described herein, the number of stations per group will be up to four. However, the described techniques may be applied to determining GID matrices using different numbers of stations as well. It may be desirable to maximize grouping coverage while minimizing the number of GIDs.

According to certain aspects, GID overloading may be restricted such that a particular station may not appear in different user positions within a GID. For example, a valid overloading scheme may be [1, 2, 3, 4] (i.e., station ID 1 at position 1, station ID 2 at position 2, station ID 3 at position 3, and station ID 4 at position 4) and [1, 2, 5, 7]. As illustrated in this example, a station may occur in more than one group within the GID at the same station. For example, station ID 1 and station ID 2 in this example are in the same position in both groups. An example for invalid overloading is [1, 2, 3, 4 ] and [1, 3, 6, 8], since, in this example, station ID 3 occurs in position 3 in one group and position 2 in the other group within the same GID.

According to certain aspects, GID matrices may be formed by organizing station IDs sequentially into a $\left\lceil \frac{M}{4} \right\rceil \times 4$ matrix.

For M is equal to or less than four, grouping is straightforward and may be done without overloading as illustrated in FIG. 5. FIGS. 7-7B are example diagrams illustrate three possible GID matrices with overloading for grouping 5-8 stations, in accordance with certain aspects of the present disclosure. In the example implementation described in FIGS. 5-8, M is equal to 6. As shown in FIG. 7, a base matrix 700 may be formed. Station IDs may be filled sequentially into four columns, starting with the uppermost row and then filling in additional rows (group overloading) until the 6 station IDs have been assigned to positions within the GID. The second GID matrix 700A may be referred to as a W1H1 (width 1, height 1) Z matrix. The second GID matrix 700A may be obtained from the base matrix 700 by reading the station IDs in z shapes with width equal to one and height equal to 1, from the base matrix 700, and entering the stations IDs horizontally, starting with the first row, as shown in FIG. 7A. The third GID matrix 700B may be obtained from the base matrix 700 by entering the station IDs in z shapes with width equal to two and height equal to one (W2H1 Z matrix) as shown in FIG. 7B.

Figure 8C:
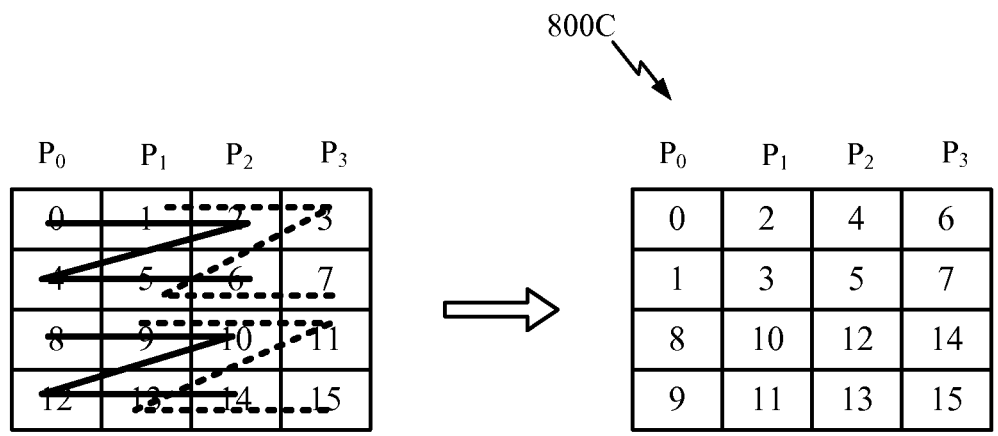
FIGS. 8-8E are example diagrams illustrating six possible GID matrices with overloading for grouping 9-16 stations, in accordance with certain aspects of the present disclosure.
Figure 8D:
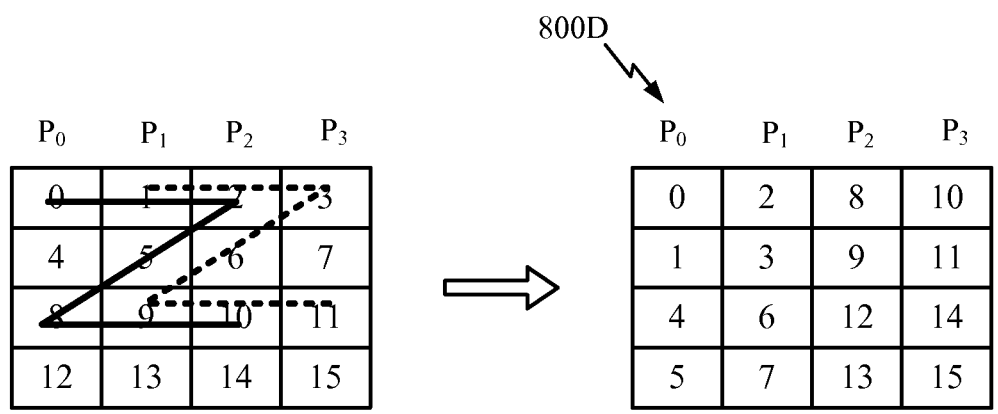
Figure 8E:
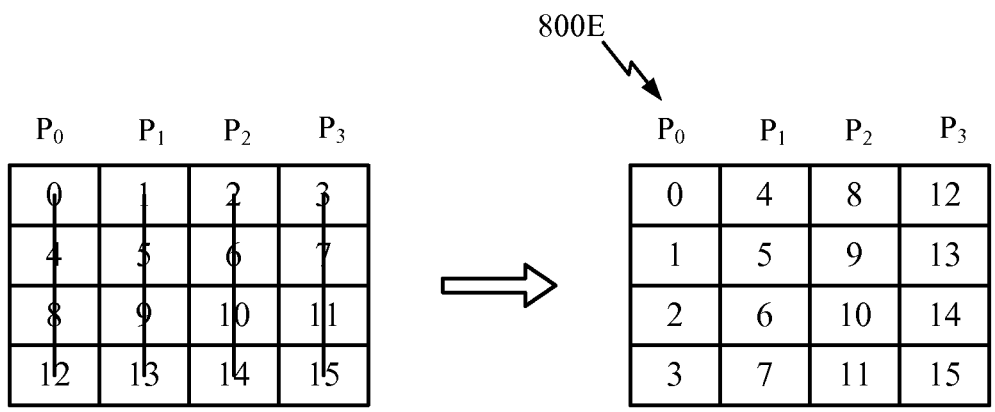

FIGS. 8-8E are example diagrams illustrating six possible GID matrices with overloading for grouping 9-16 stations, in accordance with certain aspects of the present disclosure. In the example implementation described in FIGS. 8-8E, M is equal to 16. As shown in FIG. 8, a base matrix 800 may be formed. Station IDs (0-15) may be filled sequentially into four columns, starting with the uppermost row and then filling in additional rows (group overloading) until the 16 station IDs have been assigned to positions within the GID. The second GID matrix 800A may be a W1H1 Z matrix obtained from the base matrix 800 as shown in FIG. 8A. The third GID matrix 800B may obtained from the base matrix 800 by entering the station IDs in z shapes with width equal to one and height equal to two (W1H2 Z matrix) as shown in FIG. 8B. The fourth GID matrix 800C may be a W2H1 Z matrix obtained from the base matrix 800 as shown in FIG. 8C. The fifth GID matrix 800D may be obtained from the base matrix 800 by entering the station IDs in z shapes with width equal to two and height equal to two (W2H2 Z matrix) as shown in FIG. 8D. The sixth GID matrix 800E may be obtained from the base matrix 800 by reading the stations IDs vertically, starting from the first column, from the base matrix 800 and entering the station IDs horizontally, starting at the first row (VR4HW4 matrix), as shown in FIG. 8E.

Figures 9C, 9D, 9E:
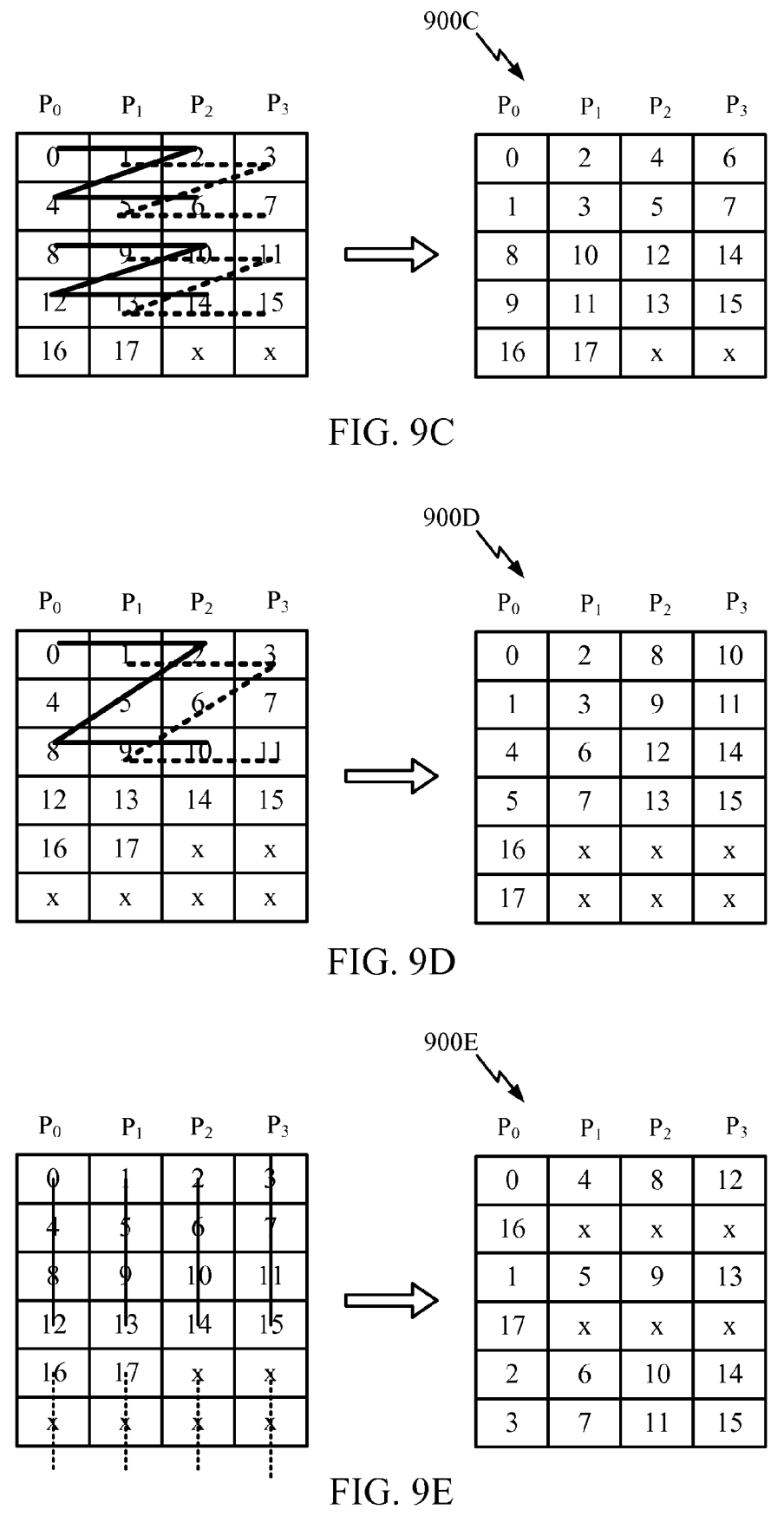
Figure 9F:
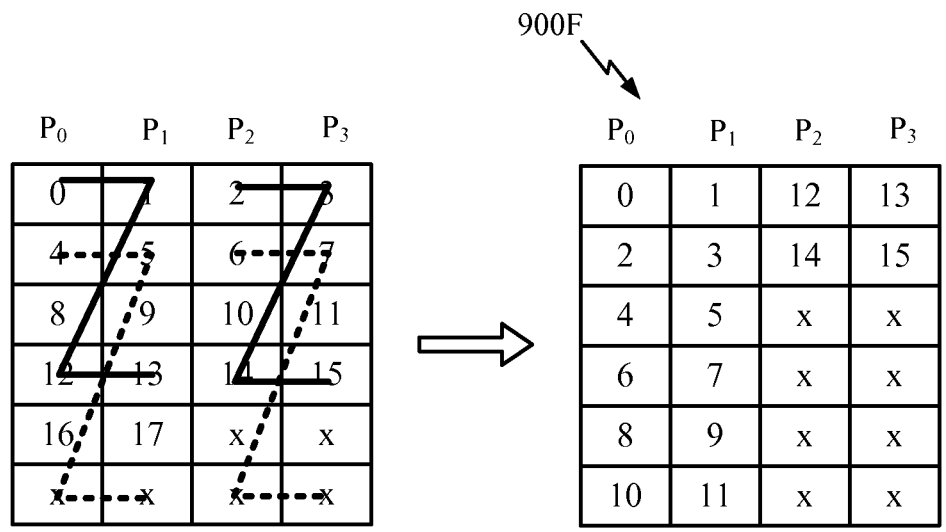
FIGS. 9-9I are example diagrams illustrating ten possible GID matrices with overloading for grouping 17-32 stations, in accordance with certain aspects of the present disclosure.
Figure 9G:
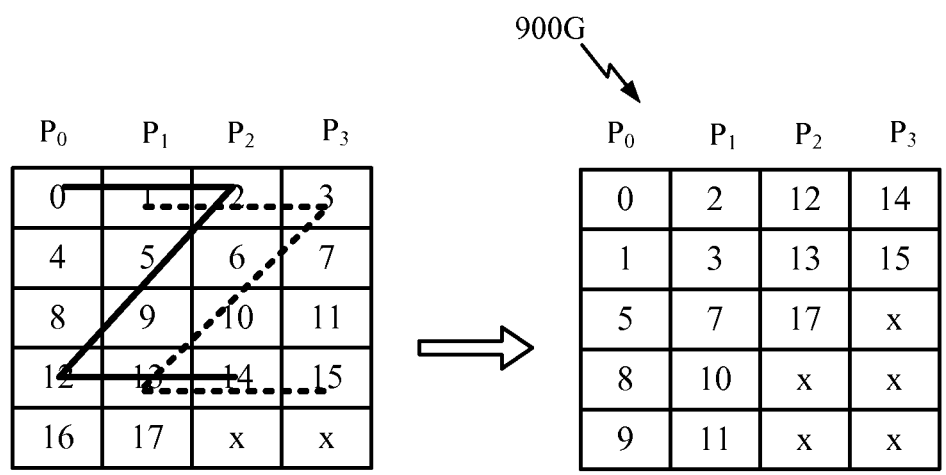

FIGS. 9-9I are example diagrams illustrating ten possible GID matrices with overloading for grouping 17-32 stations, in accordance with certain aspects of the present disclosure. In the example implementation described in FIGS. 9-9I, M is equal to 18. As shown in FIG. 9, a base matrix 900 may be formed. Station IDs (0-17) may be filled sequentially into four columns, starting with the uppermost row and then filling in additional rows (group overloading) until the 18 station IDs have been assigned to positions within the GID. The second GID matrix 900A may be a W1H1 Z matrix obtained from the base matrix 900 as shown in FIG. 9A. The third GID matrix 900B may be a W1H2 Z matrix obtained from the base matrix 900 as shown in FIG. 9B. The fourth GID matrix 900C may be a W2H1 Z matrix obtained from the base matrix 900 as shown in FIG. 9C. The fifth GID matrix 900D may be a W2H2 Z matrix obtained from the base matrix 900 as shown in FIG. 9D. The sixth GID matrix 900E may be a VR4HW4 matrix obtained from the base matrix 900 as shown in FIG. 9E. The seventh GID matrix 900F may be obtained from the base matrix 900 by entering the station IDs in z shapes with width equal to one and height equal to four (W1H4 Z matrix) as shown in FIG. 9F. The eighth GID matrix 900G may be obtained from the base matrix 900 by entering the station IDs in z shapes with width equal to two and height equal to four (W2H4 Z matrix) as shown in FIG. 9G. The ninth GID matrix 900H may be obtained from the base matrix 900 by vertically reading every other station IDs from the base matrix 900, starting from the first column, and entering the station IDs horizontally, starting at the first row, in the ninth GID matrix 900H (step 2 matrix) as shown in FIG. 9H. The tenth GID matrix 900I may be obtained from the base matrix 900 by, starting at the first column, vertically reading two station IDs from the base matrix 900, skipping two rows, and vertically reading another two station IDs from the base matrix 900 and entering the station IDs horizontally, starting at the first row, in the tenth GID matrix 900I (slit 2 matrix) as shown in FIG. 9I.

The techniques described with respect to FIGS. 6-9 may be applied for grouping larger numbers of stations by obtaining GID matrices from a base matrix using the patterns described above and additional patterns. Table 1 illustrates the number of GID matrices for grouping a corresponding number of stations. For example, fifteen GID matrices may be formed for grouping 33-64 stations. The matrices may include a base matrix with station IDs for the 32<M≤64 MU-capable stations entered sequentially, beginning in the first row. Other matrices may be obtained from the base matrix as described above, a W1H1 Z matrix, a W2H1 Z matrix, a W1H2 Z matrix, a W2H2 Z matrix, a VR4HW4 matrix, a W1H4 Z matrix, a W2H4 Z matrix, a step 2 matrix, and a slit 2 matrix. Additional patterns for obtaining addition matrices (for forming more GIDs) from the base matrix include a W1H8 Z matrix, a W2H8 Z matrix, a step 4 matrix, a slit 6 matrix, a step 2-6-2 matrix, a W1H16 Z matrix, a W2H16 Z matrix, a step 8 matrix, a slit 14 matrix, a step 2-14-2 matrix, a step 4-12-4 matrix, a W1H32 Z matrix, a W2H32 Z matrix, a step 16 matrix, a slit 30 matrix, a step 2-30-2 matrix, a step 4-28-4 matrix, a step 8-24-8 matrix, a W1H64 Z matrix, a W2H64 Z matrix, a step 32 matrix, a slit 62 matrix, a step 2-6-2 matrix, a step 4-60-4 matrix, a step 8-56-8 matrix, a step 16-48-16 matrix, a W1H128 Z matrix, a W2H128 Z matrix, a step 64 matrix, a slit 126 matrix, a step 2-126-2 matrix, a step 4-124-4 matrix, a step 8-120-8 matrix, a step 16-112-16 matrix, a W1H256 Z matrix, a W2H256 Z matrix, a step 128 matrix, a slit 256 matrix, a step 2-254-2 matrix, a step 4-252-4 matrix, a step 8-248-8 matrix, a step 16-240-16 matrix, and a step 32-224-32 matrix.

Although not shown in FIGS. 9-9I, the step 2-6-2 matrix (and similar matrices) may be obtained from the base matrix 900 by reading station IDs from the base station matrix 900, starting from the first column, and from rows following the sequence r, r+2, r+10 (e.g., 1, 3, 9, 11), and entering station IDs horizontally, starting at the first row.

According to certain aspects, using additional patterns, 21 GID matrices may be formed for grouping 65-128 stations, 28 GID matrices may be formed for grouping 129-256 stations, 36 GID matrices may be formed for grouping 257-512 stations, 45 GID matrices may be formed for grouping 513-1024 stations, 55 GID matrices may be formed for grouping 1025-2048 stations, and 62 GID matrices may be formed for grouping more than 2048 stations.

TABLE 1

| M | #GIDs |
| --- | --- |
| 2-4 | 1 |
| 5-8 | 3 |
| 9-16 | 6 |
| 17-32 | 10 |

TABLE 1-continued

| M | #GIDs |
| --- | --- |
| 33-64 | 15 |
| 65-128 | 21 |
| 129-256 | 28 |
| 257-512 | 36 |
| 513-1024 | 45 |
| 1025-2048 | 55 |
| >2048 | 62 |

Figure 10:
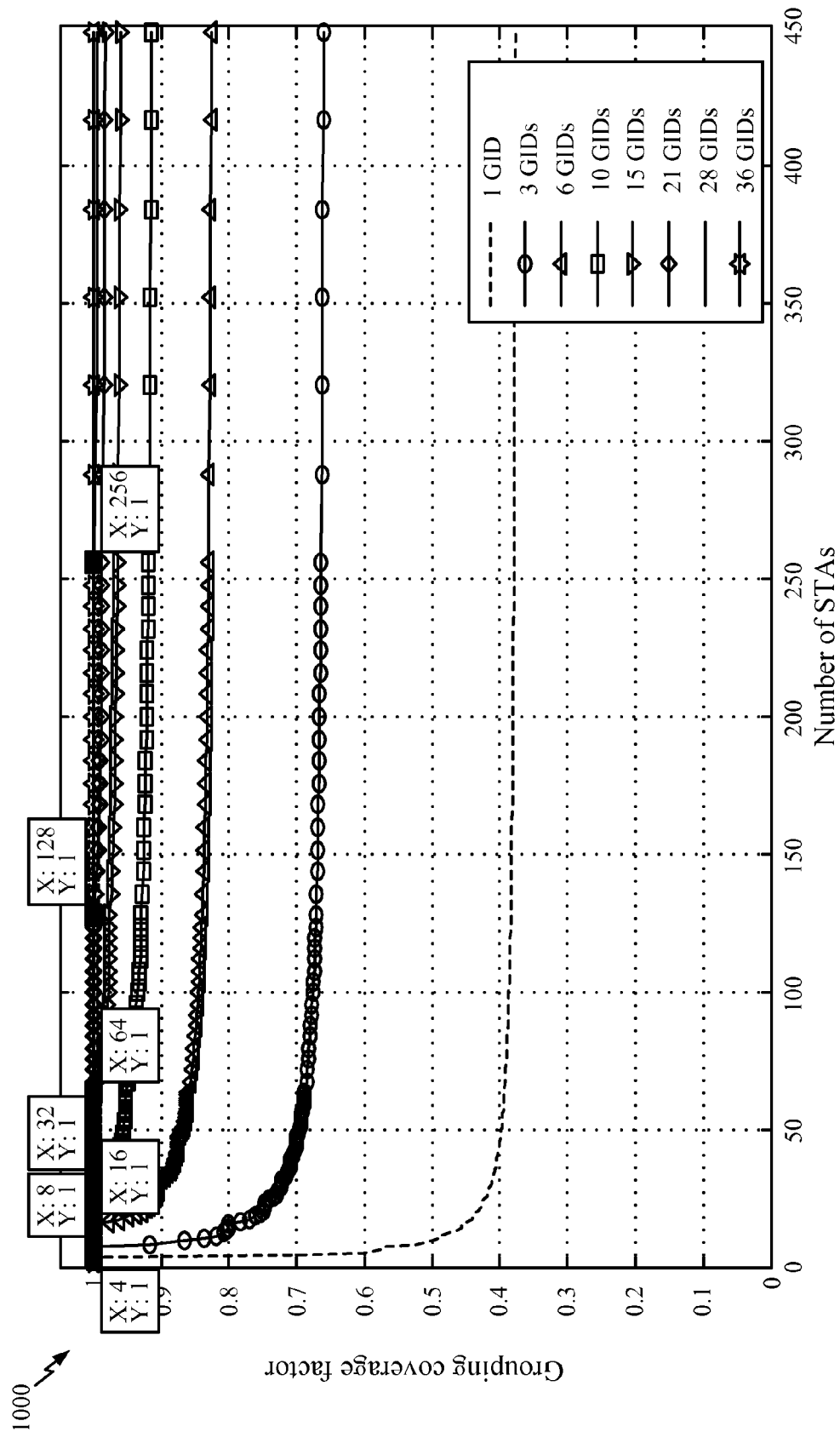
FIG. 10 is an example graph illustrating grouping coverage as a function of the number of stations for various numbers of GIDs, in accordance with certain aspects of the present disclosure.

Forming MU groups as described herein may provide coverage for a large number of possible 3-station combinations (e.g., for MU3 transmissions). For example, for 2048 stations, 1,429,559,296 combinations may exist. Grouping coverage may be defined as the percentage of covered 3-station groups out of all possible 3-station groups. FIG. 10 is an example graph 1000 illustrating grouping coverage as a function of the number of stations (M) for various numbers of GIDs, in accordance with certain aspects of the present disclosure. As shown in FIG. 10, the techniques proposed herein may cover all 3-station combinations for up to M=512 with 36 GIDs. Using 55 GIDs may cover all 3-station combinations for up to M=2048 (not shown in the example figure). For more than 2048 stations, the techniques proposed herein asymptotically cover around 99% of all possible 3-station combinations.

According to certain aspects, equations may be used to assign appropriate stations IDs to form the GID matrices described above. For example, each equation may correspond to one of the patterns described above used for forming the matrices. For each GID matrix, a column index c and row index r (c and r defining a user position in the GID matrix) may be input into the corresponding equation to obtain the station ID to enter into that user position. The station ID may be 0-based user index. FIG. 11 shows the equations, corresponding to the 15 different patterns described above, for determining a UID to enter into a user position in a GID matrix, in accordance with certain aspects of the present disclosure. According to certain aspects, similar equations may be derived for the additional patterns used to form GIDs for larger numbers of stations.

According to certain aspects, for a reverse-mapping, similar equations may be derived for determining a station's user position(s) (row and column) within a GID matrix based on the station's UID, as described in more detail in the next section.

According to certain aspects, GIDs may be stored in memory, for example at the AP or externally. Alternatively, GIDs may be formed on-the-fly when a new station associates. Since the equations (shown in FIGS. 11 and 11A) are simple equations, the processing needed to compute the GIDs may be minimal. The equations shown in FIGS. 11 and 11A may be used to form up to 45 GIDs.

Example Position Lookup and GID Selection

According to certain aspects, the AP may perform position lookup based on stations UID in order to select an appropriate GID for grouping the stations for MU scheduling. Based on the UID, using equations corresponding to each GID, the AP may determine each stations row index r and column index c within each GID matrix. FIG. 12 shows the equations, corresponding to the 15 different patterns described above, for determining a stations user position in each GID matrix based on the station's UID. According to certain aspects, similar equations may be derived for the additional patterns used to form GIDs for larger numbers of stations.

As may be seen from the FIGS. 7-9 and the equations in FIGS. 11, 11A, and 12, the stations' user positions (c) within a GID matrix may not depend on the number active MU capable stations (M). Therefore, since the user position does not change, when an additional MU capable station associates with the AP, the AP may not need to re-determine the GID matrices or the user positions of the current stations and, thus, does not need to send any additional GID management frames to those stations. Instead, the AP may determine the user positions for the newly associated station only and send a GID management frame to that station.

Figure 13:
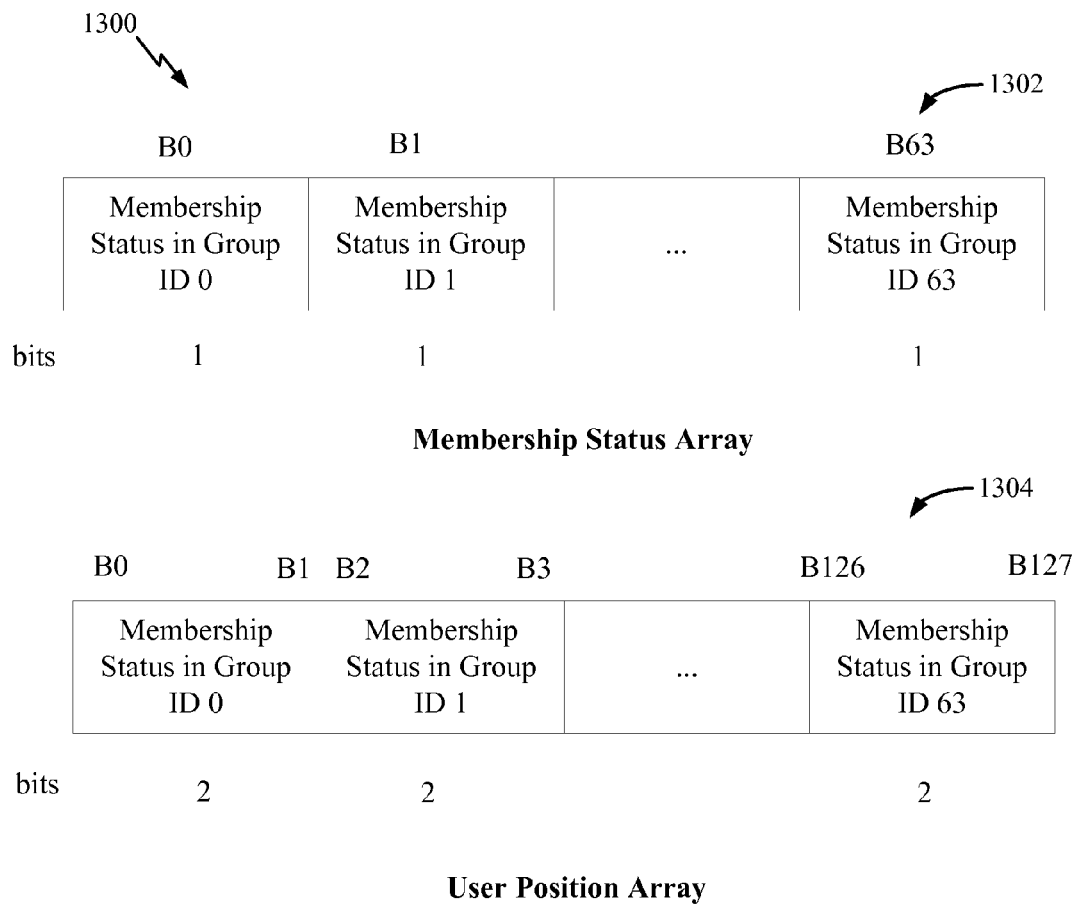
FIG. 13 illustrates an example management frame format including a Membership Status Array and User Position Array, in accordance with certain aspects of the present disclosure.

FIG. 13 illustrates an example management frame format 1300 including a Membership Status Array 1302 and a User Position Array 1304, in accordance with certain aspects of the present disclosure. As shown in FIG. 13, the Membership Status Array 1302 may be 8 bytes including 64 1-bit membership status fields for each of the 64 GIDs; for each membership status field, a 1 may indicate that the recipient user is a member of the corresponding group and 0 may indicate that the recipient user is not a member of that group. The User Position Array 1304 may be 16 bytes including 64 2-bit fields indicating user position in the corresponding GID.

According to certain aspects, when scheduling active stations for MU transmission, the AP may send each station a GID management frame including that stations user position(s) within each GID matrix. According to certain aspects, the GID management frames may include only the column index for the stations' user positions, since for GID selection, a station may occur in more than one group (row) within the GID matrix, but the AP may rule out any GID where a station occurs in more than user position (column) within the GID matrix. According to certain aspects, even when not all GIDs are currently needed (e.g., when M<8, only 3 GIDs is sufficient), the AP may send the positions of each station for all 62 GIDs. Thus, even if additional stations are added (e.g., M>8), a new GID management frame will not be sent to the already-associated stations since they will already know their user positions in all of the GID matrices.

In an illustrative example, for three stations having $UID_0$, $UID_1$, and $UID_2$, the AP may calculate the user position of each of the stations, for example, using the appropriate equations from FIG. 12 (although not shown in FIG. 12, additional equations corresponding to other matrices may be used). For example, for each STA i, the AP may determine $$C_i = [c_{base_i} \, c_{W1H1Z_i} \, c_{W2H1Z_i} \, c_{W1H2Z_i} \, c_{W2H2Z_i} \, c_{VR4HW4_i} \\ c_{W1H4Z_i} \, c_{W2H4Z_i} \, c_{step2_i} \, c_{slit2_i} \, c_{W1H8Z_i} \, c_{W2H8Z_i} \\ c_{stepA_i} \, c_{slit6_i} \, c_{step262_i}].$$

The AP may then find a GID matrix for which the value of c is different for all stations (to avoid multiple stations assigned to the same user position). For example, considering the case of M=18, to schedule stations 6, 9, and 14. As shown in FIGS. 9-9I, for 18 MU capable stations, there are ten possible GID matrices. As shown in FIGS. 9-9I, the user positions for stations 6, 9, and 14 in the ten GID matrices may be $C_6$=[2 2 0 3 1 1 0 1 0 1], $C_9$=[1 1 3 0 2 2 1 0 1 0], and $C_{14}$=[2 2 2 3 3 2 3 1 1]. Thus, as can be seen from the arrays, possible GIDs for scheduling stations 6, 9, and 14, are $c_{W2H1Z}$, $c_{W2HwZ}$, $c_{VR4HW4}$, $c_{W1H4Z}$, $c_{W2H1Z}$, and $c_{W2H4Z}$ having the stations 6, 9, and 14 in different user positions $$\begin{bmatrix} 0 \\ 3 \\ 2 \end{bmatrix}, \begin{bmatrix} 1 \\ 2 \\ 3 \end{bmatrix}, \begin{bmatrix} 1 \\ 2 \\ 3 \end{bmatrix}, \begin{bmatrix} 0 \\ 1 \\ 2 \end{bmatrix}, \text{ and } \begin{bmatrix} 1 \\ 0 \\ 3 \end{bmatrix},$$

respectively.

Figure 14:
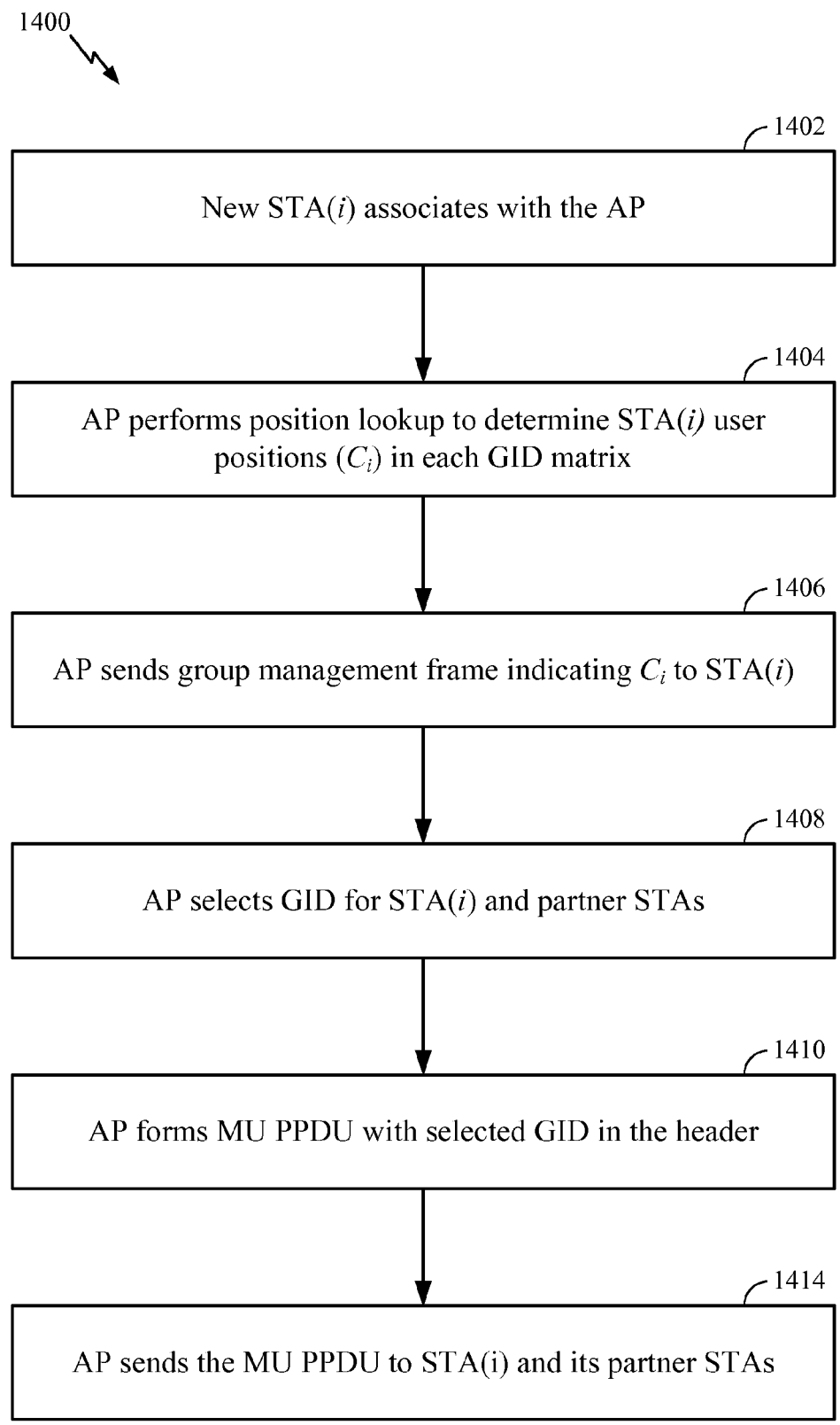
FIG. 14 is a flow diagram illustrating example operations for selecting a GID and sending a GID management frame, in accordance with certain aspects of the present disclosure.

FIG. 14 is a flow diagram illustrating example operations 1400 for selecting a GID and sending a GID management frame, in accordance with certain aspects of the present disclosure. According to certain aspects, each time a new station associates with the AP, as at 1402, the AP looks up the newly associated station's user positions in each GID matrix, at 1404, for example, using the position lookup equations shown in FIG. 12. At 1406, the AP then sends a GID management frame to the newly associated station indicating the station's user positions in the GID matrices. At 1408, the AP may select a GID for the newly associated station, for example, according to the criteria discussed above for selecting a GID. At 1410, the AP may form an MU PPDU including the selected GID in the header of the packet and send the MU PPDU to the group of MU capable stations at 1412.

Example MU Scheduling with GID Overloading

According to certain aspects of the present disclosure, the scheduling of stations and the grouping of stations may be decoupled. Since, as illustrated in FIG. 10, the techniques provided herein provide optimal GID coverage for up to 2048 stations and near optimal coverage for greater than 2048 stations, if the scheduling algorithm selects any set of stations for MU transmissions it will be guaranteed to find a GID for these stations. Thus, the probability of not finding a feasible GID for a set stations chosen for scheduling is 0 for up to 2048 stations and very low (~1%) for larger number of stations.

Figure 15:
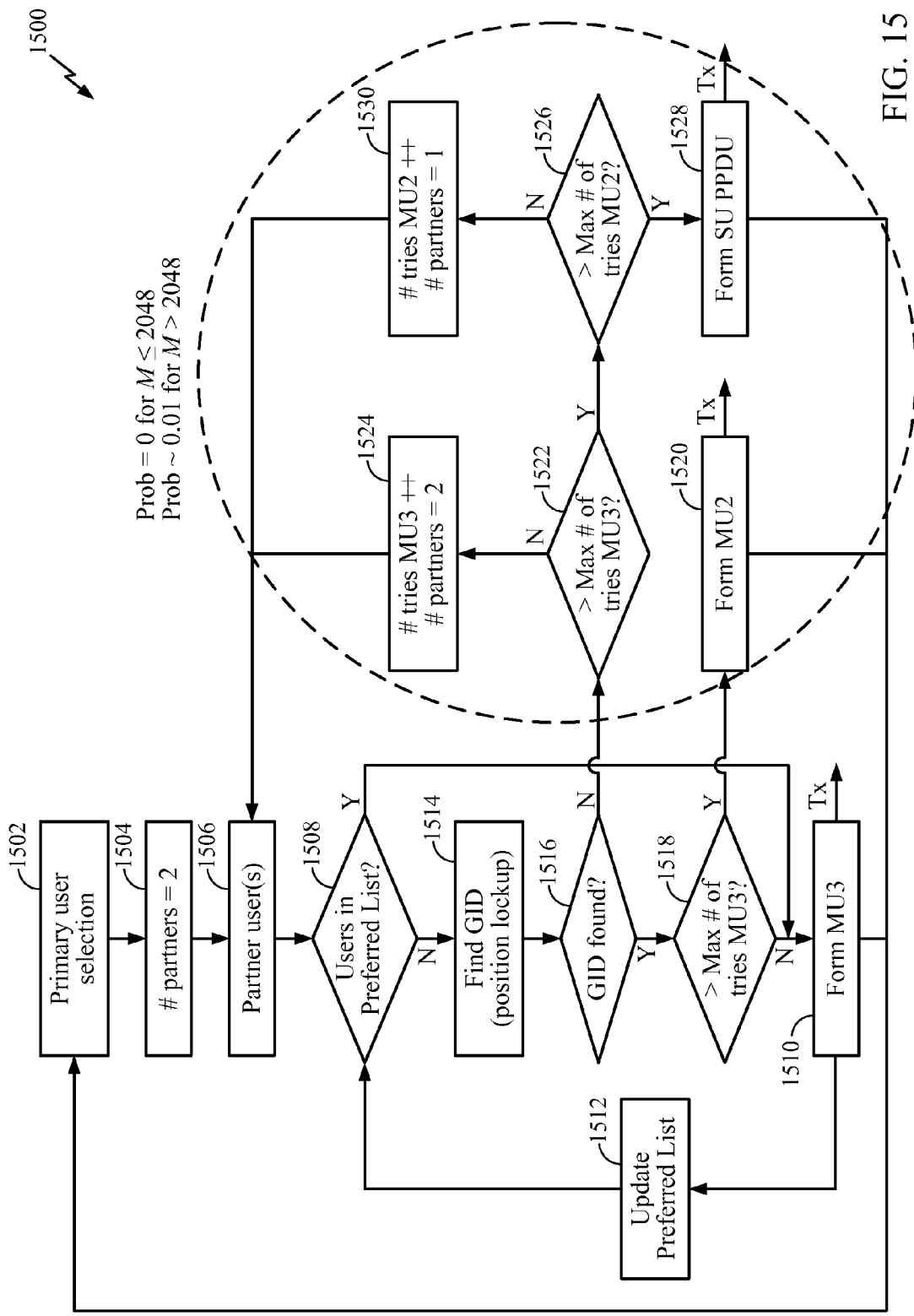
FIG. 15 is a flow diagram of operations for an iterative approach to joint MU scheduling and grouping, in accordance with certain aspects of the present disclosure.

FIG. 15 is a flow diagram of operations 1500 for an iterative approach to joint MU scheduling and grouping, in accordance with certain aspects of the present disclosure. As shown in FIG. 15, at 1502, the AP may select a primary user (station). At 1504, the AP may determine a number of partners, for example, two partners may be desirable for MU3 transmission. At 1506, the AP may determine which station to partner with primary user. At 1508, the AP may determine whether the selected partners are in a preferred list. A preferred list may be obtained, for example, based on Packet Error Rate (PER) of recent MU transmissions. If yes, at 1510, the AP form the MU3 PPDU and transmit it and, at 1512, update the preferred list. If no, at 1514, the AP may perform position lookup for the selected users and, at 1516 determine if there are any feasible GIDs. If a feasible GID is found, at 1510 the AP may attempt to form the MU3 PPDU with the GID and update the preferred list at 1512. If the MU3 transmission is not formed after a max number of attempts at 1518, the AP may form a MU2 PPDU, at 1520, for transmission. If a feasible GID is not found at 1516, and a maximum number of tries, at 1522, has not been reached, then at 1524 the AP may reselect partners 1506 and repeat the operations until successfully forming an MU3 at 1510 or until a maximum number of attempts at 1522 has been reached. If the maximum number of attempts is reached, then at 1530 the AP may attempt to reselect only partner for a MU2 transmission until successful or until a maximum number of attempts at 1526 are unsuccessful, at which time the AP forms an SU PPDU for transmission to the primary user at 1528.

Figure 16:
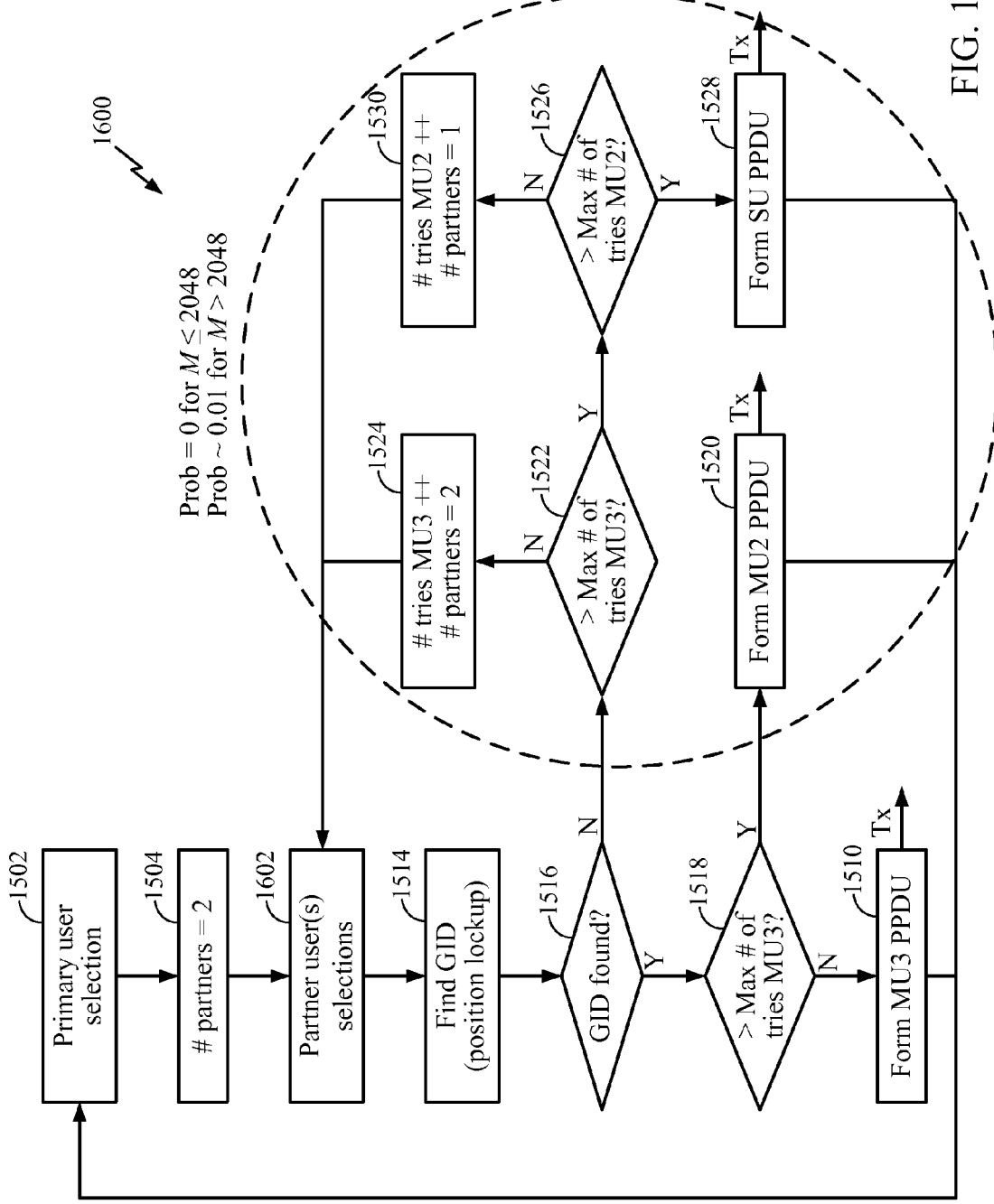
FIG. 16 is a flow diagram of operations for an iterative approach to MU scheduling, in accordance with certain aspects of the present disclosure.

FIG. 16 is a flow diagram of operations 1600 for an alternative iterative approach to joint MU scheduling and grouping, in accordance with certain aspects of the present disclosure. The approach in FIG. 16 does not implement a preferred list, which may be beneficial in avoiding the memory required for maintaining the preferred list. For example, as shown in FIG. 16, after the AP selects partner user(s) at 1602, the block 1508 of determining whether the users are included in a preferred list and the block 1512 corresponding to updating a preferred list may be omitted. Instead, after partner user(s) selection at 1602, the AP may perform position lookup for the selected users.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6 correspond to means 600A illustrated in FIG. 6A.

For example, means for outputting and means for transmitting may be the transmitter (e.g., the transmitter unit of transceiver 222) and/or antenna(s) 224 of access point 110 illustrated in FIG. 2.

Means for processing, means for determining, means for generating, means for associating, means for scheduling, means for selecting, means for assigning, means for storing, means for avoiding, and means for utilizing may comprise a processing system, which may include one or more processors, such as the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above for providing an immediate response indication in a PHY header. For example, an algorithm for assigning, for each GID of a plurality of GIDs, a plurality of devices to positions within one or more groups associated with that GID, an algorithm for generating GID management frames for transmission to active devices of the plurality of devices indicating, for each of the active devices, a position of that active device within each of the plurality of GIDs, and an algorithm for outputting the GID management frames for transmission to the active devices.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer—

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for assigning, for each GID of a plurality of GIDs, a plurality of devices to positions within one or more groups associated with that GID, instructions for generating GID management frames for transmission to active devices of the plurality of devices indicating, for each of the active devices, a position of that active device within each of the plurality of GIDs, and instructions for outputting the GID management frames for transmission to the active devices.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims

What is claimed is:

1. An apparatus for wireless communications, comprising:
a processing system configured to:
assign, for each group identification (GID) of a plurality of GIDs, a plurality of devices to positions within one or more groups associated with that GID, wherein the processing system is configured to assign the plurality of devices to the positions in that GID by:
determining, for each row index value and column index value of that GID, an identification value of a device based on the row index value and the column index value, wherein the row index value and the column index value define the position within a group associated with that GID; and
assigning the device associated with the identification value to that row and column of that GID;
generate GID management frames for transmission to active devices of the plurality of devices indicating, for each of the active devices, a position of that active device within each of the plurality of GIDs;
schedule a set of the active devices for a multi-user (MU) multiple-input multiple output (MIMO) transmission; and
select one of the plurality of GIDs for the MU-MIMO transmission to the scheduled set of the active devices, based on identification values of the active devices in the scheduled set of the active devices; and
an interface configured to:
output the GID management frames for transmission to the active devices; and output data for transmission to the set of the active devices as the MU-MIMO transmission using the selected GID.

2. The apparatus of claim 1, wherein the processing system is further configured to select the active devices to be scheduled in the set of the active devices for the MU-MIMO transmission based on at least one of modulations and coding scheme (MCS), channel correlation, channel variation, Doppler profile, fairness, or traffic availability.

3. The apparatus of claim 1, wherein the processing system is configured to select one of the plurality of GIDs for the MU-MIMO transmission to the scheduled set of the active devices by:
determining the position of each active device within each of the plurality of GIDs based on the identification value associated with that active device; and
selecting, from the plurality of GIDs, a GID that does not have any single device assigned to different positions within the GID.

4. The apparatus of claim 1, wherein the processing system is configured to schedule the set of the active devices for the MU-MIMO transmission by:
selecting a candidate set of the active devices, wherein the candidate set includes a primary device of the active devices and one or more other devices of the active devices;
determining whether the one or more other devices are included in a preferred list of devices; and
scheduling the candidate set for the MU-MIMO transmission if the one or more other devices are included in the preferred list of devices or attempting to select a different GID if the one or more other devices are not included in the preferred list.

5. The apparatus of claim 1, wherein:
the processing system is further configured to associate with another device of the plurality of devices, and generate an additional GID management frame for transmission to the other device only, indicating a position of the other device within each of the plurality of GIDs; and
the interface is configured to output the additional GID management frame for transmission to the other device.

6. The apparatus of claim 1, wherein the plurality of devices comprise MU-MIMO capable devices.

7. The apparatus of claim 1, wherein the processing system is further configured to assign multiple devices to the same position in different groups associated with a same GID.

8. The apparatus of claim 1, wherein the processing system is further configured to avoid assigning a same device to different positions within different groups associated with a same GID.

9. The apparatus of claim 1, wherein the processing system is configured to:
store the assignments of the plurality of devices to the plurality of GIDs for use in generating additional GID management frames for transmission to newly associated devices.

10. A method for wireless communications, comprising:
assigning, for each group identification (GID) of a plurality of GIDs, a plurality of devices to positions within one or more groups associated with that GID, wherein the assigning comprises:
determining, for each row index value and column index value of that GID, an identification value of a device based on the row index value and the column index value, wherein the row index value and the column index value define the position within a group associated with that GID; and
assigning the device associated with the identification value to that row and column of that GID;
generating GID management frames for transmission to active devices of the plurality of devices indicating, for each of the active devices, a position of that active device within each of the plurality of GIDs;
outputting the GID management frames for transmission to the active devices;
scheduling a set of the active devices for a multi-user (MU) multiple-input multiple-output (MIMO) transmission;
selecting one of the plurality of GIDs for the MU-MIMO transmission to the scheduled set of the active devices, based on identification values of the active devices in the scheduled set of the active devices; and
outputting data for transmission to the set of the active devices as the MU-MIMO transmission using the selected GID.

11. The method of claim 10, further comprising:
selecting the active devices to be scheduled in the set of the active devices for the MU-MIMO transmission based on at least one of modulations and coding scheme (MCS), channel correlation, channel variation, Doppler profile, fairness, or traffic availability.

12. The method of claim 10, wherein the selecting comprises:
determining the position of each active device within each of the plurality of GIDs based on the identification value associated with that active device; and
selecting, from the plurality of GIDs, a GID that does not have any single device assigned to different positions within the GID.

13. The method of claim 10, wherein the scheduling comprises:
selecting a candidate set of the active devices, wherein the candidate set includes a primary device of the active devices and one or more other devices of the active devices;
determining whether the one or more other devices are included in a preferred list of devices; and
scheduling the candidate set for the MU-MIMO transmission if the one or more other devices are included in the preferred list of devices or attempting to select a different GID if the one or more other devices are not included in the preferred list.

14. The method of claim 10, further comprising:
associating with another device of the plurality of devices;
generating an additional GID management frame for transmission to the other device only, indicating a position of the other device within each of the plurality of GIDs; and
outputting the additional GID management frame for transmission to the other device.

15. The method of claim 10, wherein the plurality of devices comprise MU-MIMO capable devices.

16. The method of claim 10, wherein the assigning comprises:
assigning multiple devices to the same position in different groups associated with a same GID.

17. The method of claim 10, wherein the assigning comprises:
avoid assigning a same device to different positions within different groups associated with a same GID.

18. The method of claim 10, further comprising:
storing the assignments of the plurality of devices to the plurality of GIDs for use in generating additional GID management frames for transmission to newly associated devices.

19. An apparatus for wireless communications, comprising:
means for assigning, for each group identification (GID) of a plurality of GIDs, a plurality of devices to positions within one or more groups associated with that GID, wherein the means for assigning comprises:
means for determining, for each row index value and column index value of that GID, an identification value of a device based on the row index value and the column index value, wherein the row index value and the column index value define the position within a group associated with that GID, and
means for assigning the device associated with the identification value to that row and column of that GID;
means for generating GID management frames for transmission to active devices of the plurality of devices indicating, for each of the active devices, a position of that active device within each of the plurality of GIDs;
means for outputting the GID management frames for transmission to the active devices;
means for scheduling a set of the active devices for a multi-user (MU) multiple-input multiple-output (MIMO) transmission;
means for selecting one of the plurality of GIDs for the MU-MIMO transmission to the scheduled set of the active devices, based on identification values of the active devices in the scheduled set of the active devices; and
means for outputting data for transmission to the set of the active devices as the MU-MIMO transmission using the selected GID.

20. The apparatus of claim 19, wherein the means for selecting comprises:
means for determining the position of each active device within each of the plurality of GIDs based on an identification value associated with that active device; and
means for selecting, from the plurality of GIDs, a GID that does not have any single device assigned to different positions within the GID.

21. The apparatus of claim 19, wherein the means for scheduling comprises:
means for selecting a candidate set of the active devices, wherein the candidate set includes a primary device of the active devices and one or more other devices of the active devices;
means for determining whether the one or more other devices are included in a preferred list of devices; and
means for scheduling the candidate set for the MU-MIMO transmission if the one or more other devices are included in the preferred list of devices or attempting to select a different GID if the one or more other devices are not included in the preferred list.

22. The apparatus of claim 19, further comprising:
means for associating with another device of the plurality of devices;
means for generating an additional GID management frame for transmission to the other device only, indicating a position of the other device within each of the plurality of GIDs, and
means for outputting the additional GID management frame for transmission to the other device.

23. The apparatus of claim 19, further comprising:
means for storing the assignments of the plurality of devices to the plurality of GIDs for use in generating additional GID management frames for transmission to newly associated devices.

24. An access point (AP), comprising:
a processing system configured to:
assign, for each group identification (GID) of a plurality of GIDs, a plurality of devices to positions within one or more groups associated with that GID, wherein the processing system is configured to assign the plurality of devices to the positions in that GID by:
determining, for each row index value and column index value of that GID, an identification value of a device based on the row index value and the column index value, wherein the row index value and the column index value define the position within a group associated with that GID; and
assigning the device associated with the identification value to that row and column of that GID;
generate GID management frames for transmission to active devices of the plurality of devices indicating, for each of the active devices, a position of that active device within each of the plurality of GIDs;
schedule a set of the active devices for a multi-user (MU) multiple-input multiple output (MIMO) transmission; and
select one of the plurality of GIDs for the MU-MIMO transmission to the scheduled set of the active devices, based on identification values of the active devices in the scheduled set of the active devices; and
a transmitter configured to:
transmit the GID management frames to the active devices; and
transmit data to the set of the active devices as the MU-MIMO transmission using the selected GID.

* * * * *